US008332478B2

(12) United States Patent
Levy et al.

(10) Patent No.: US 8,332,478 B2
(45) Date of Patent: Dec. 11, 2012

(54) CONTEXT SENSITIVE CONNECTED CONTENT

(75) Inventors: Kenneth L. Levy, Stevenson, WA (US); Geoffrey B. Rhoads, West Linn, OR (US); Reed R. Stager, Portland, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 3178 days.

(21) Appl. No.: 09/952,475

(22) Filed: Sep. 11, 2001

(65) Prior Publication Data

US 2002/0033844 A1 Mar. 21, 2002

Related U.S. Application Data

(63) Continuation-in-part of application No. 09/636,102, filed on Aug. 10, 2000, now abandoned, and a continuation-in-part of application No. 09/620,019, filed on Jul. 20, 2000, now Pat. No. 7,689,532, and a continuation-in-part of application No. 09/531,076, filed on Mar. 18, 2000, now Pat. No. 8,180,844, and a continuation-in-part of application No. 09/526,982, filed on Mar. 15, 2000, now Pat. No. 6,516,079, and a continuation-in-part of application No. 09/507,096, filed on Feb. 17, 2000, now abandoned, and a continuation-in-part of application No. 09/503,881, filed on Feb. 14, 2000, now Pat. No. 6,614,914, and a continuation-in-part of application No. 09/165,142, filed on Oct. 1, 1998, now Pat. No. 6,421,070.

(60) Provisional application No. 60/191,778, filed on Mar. 24, 2000, provisional application No. 60/232,163, filed on Sep. 11, 2000, provisional application No. 60/282,205, filed on Apr. 6, 2001.

(51) Int. Cl.
*G06F 15/16* (2006.01)

(52) U.S. Cl. ........ 709/217; 709/218; 709/219; 370/464; 370/474; 382/232; 713/176

(58) Field of Classification Search .................... 705/51; 713/173; 345/744; 709/217, 231, 247, 220, 709/223, 249
See application file for complete search history.

(56) References Cited

U.S. PATENT DOCUMENTS 4,230,990 A 10/1980 Lert et al.
(Continued)

FOREIGN PATENT DOCUMENTS

EP 0493091 7/1992
(Continued)

OTHER PUBLICATIONS

Rhoads, U.S. Appl. No. 60/134,782, filed May 19, 1999.
(Continued)

*Primary Examiner* — Backhean Tiv

(57) ABSTRACT

The disclosure describes a method of connecting multimedia content to a network resource. This method operates in a computer network environment. Operating in a network connected device, the method extracts an identifier from a media signal, such as from a digital watermark, perceptual hash, or other machine extracted signal identifier. It then sends the identifier to a network along with context information indicating device type information. From the network, the method receives related data associated with the media signal via the identifier. The related data is adapted to the network connected device based on the device type information. This device type information may include a display type, so that the related date may be formatted for rendering on the display type of the device. This device type information may also include a connection speed so that the related data may be optimized for the connection speed of the device.

20 Claims, 8 Drawing Sheets

U.S. PATENT DOCUMENTS

| | | | |
|---|---|---|---|
| 4,499,601 A | 2/1985 | Matthews | |
| 4,682,370 A | 7/1987 | Matthews | |
| 4,697,209 A | 9/1987 | Kiewit | |
| 4,739,398 A | 4/1988 | Thomas et al. | |
| 4,994,987 A | 2/1991 | Baldwin | |
| 5,134,719 A | 7/1992 | Mankovitz | |
| 5,315,098 A | 5/1994 | Tow | |
| 5,410,598 A | 4/1995 | Shear | |
| 5,415,553 A | 5/1995 | Szmidla | |
| 5,428,601 A * | 6/1995 | Owen | 370/330 |
| 5,444,779 A | 8/1995 | Daniele | |
| 5,450,490 A | 9/1995 | Jensen et al. | |
| 5,473,631 A | 12/1995 | Moses | |
| 5,485,518 A | 1/1996 | Hunter | |
| 5,493,677 A * | 2/1996 | Balogh et al. | 382/305 |
| 5,519,778 A | 5/1996 | Leighton | |
| 5,577,266 A | 11/1996 | Takahisa | |
| 5,581,800 A | 12/1996 | Fardeau et al. | |
| 5,629,980 A | 5/1997 | Stefik | |
| 5,634,012 A * | 5/1997 | Stefik et al. | 705/39 |
| 5,646,990 A | 7/1997 | Li | |
| 5,646,997 A * | 7/1997 | Barton | 713/176 |
| 5,652,714 A * | 7/1997 | Peterson et al. | 702/57 |
| 5,657,462 A * | 8/1997 | Brouwer et al. | 715/709 |
| 5,703,795 A | 12/1997 | Mankovitz | |
| 5,708,478 A | 1/1998 | Tognazzini | |
| 5,721,788 A | 2/1998 | Powell et al. | |
| 5,740,244 A | 4/1998 | Indeck et al. | |
| 5,764,763 A | 6/1998 | Jensen | |
| 5,765,152 A | 6/1998 | Erickson | |
| 5,765,176 A | 6/1998 | Bloomberg | |
| 5,782,692 A | 7/1998 | Stelovsky | |
| 5,822,432 A * | 10/1998 | Moskowitz et al. | 380/28 |
| 5,838,458 A | 11/1998 | Tsai | |
| 5,841,978 A * | 11/1998 | Rhoads | 709/217 |
| 5,845,281 A | 12/1998 | Benson | |
| 5,848,413 A | 12/1998 | Wolff | |
| 5,848,424 A * | 12/1998 | Scheinkman et al. | 715/210 |
| 5,850,481 A | 12/1998 | Rhoads | |
| 5,852,673 A * | 12/1998 | Young | 382/164 |
| 5,862,260 A * | 1/1999 | Rhoads | 382/232 |
| 5,872,531 A | 2/1999 | Johnson | |
| 5,884,056 A * | 3/1999 | Steele | 715/738 |
| 5,889,868 A * | 3/1999 | Moskowitz et al. | 713/176 |
| 5,892,536 A | 4/1999 | Logan | |
| 5,903,892 A * | 5/1999 | Hoffert et al. | 1/1 |
| 5,918,223 A | 6/1999 | Blum | |
| 5,920,861 A * | 7/1999 | Hall et al. | 1/1 |
| 5,920,878 A * | 7/1999 | DeMont | 715/236 |
| 5,923,327 A | 7/1999 | Smith et al. | |
| 5,956,716 A * | 9/1999 | Kenner et al. | 1/1 |
| 5,963,964 A * | 10/1999 | Nielsen | 715/255 |
| 5,978,477 A | 11/1999 | Hull et al. | |
| 5,978,773 A | 11/1999 | Hudetz | |
| 5,982,956 A | 11/1999 | Lahmi | |
| 5,991,737 A | 11/1999 | Chen | |
| 5,991,876 A * | 11/1999 | Johnson et al. | 726/28 |
| 5,995,978 A | 11/1999 | Cullen et al. | |
| 6,014,569 A | 1/2000 | Bottum | |
| 6,049,627 A * | 4/2000 | Becker et al. | 382/181 |
| 6,064,737 A | 5/2000 | Rhoads | |
| 6,076,734 A | 6/2000 | Dougherty et al. | |
| 6,098,106 A | 8/2000 | Philyaw et al. | |
| 6,121,530 A | 9/2000 | Sonoda | |
| 6,122,403 A * | 9/2000 | Rhoads | 382/233 |
| 6,131,162 A * | 10/2000 | Yoshiura et al. | 713/176 |
| 6,141,753 A * | 10/2000 | Zhao et al. | 713/176 |
| 6,182,090 B1 | 1/2001 | Peairs | |
| 6,182,218 B1 * | 1/2001 | Saito | 713/176 |
| 6,185,683 B1 | 2/2001 | Ginter | |
| 6,188,010 B1 | 2/2001 | Iwamura | |
| 6,199,076 B1 * | 3/2001 | Logan et al. | 715/203 |
| 6,205,249 B1 | 3/2001 | Moskowitz | |
| 6,226,618 B1 * | 5/2001 | Downs et al. | 705/51 |
| 6,240,121 B1 * | 5/2001 | Senoh | 375/130 |
| 6,240,185 B1 | 5/2001 | Van Wie et al. | |
| 6,240,459 B1 | 5/2001 | Roberts | |
| 6,243,480 B1 * | 6/2001 | Zhao et al. | 382/100 |
| 6,249,226 B1 | 6/2001 | Harrison et al. | |
| 6,260,040 B1 * | 7/2001 | Kauffman et al. | 1/1 |
| 6,278,781 B1 | 8/2001 | Rhoads | |
| 6,286,036 B1 | 9/2001 | Rhoads | |
| 6,300,880 B1 | 10/2001 | Sitnik | |
| 6,311,214 B1 | 10/2001 | Rhoads | |
| 6,324,573 B1 | 11/2001 | Rhoads | |
| 6,366,907 B1 * | 4/2002 | Fanning et al. | 1/1 |
| 6,389,538 B1 * | 5/2002 | Gruse et al. | 713/194 |
| 6,400,272 B1 | 6/2002 | Holtzman et al. | |
| 6,408,331 B1 | 6/2002 | Rhoads | |
| 6,411,725 B1 | 6/2002 | Rhoads | |
| 6,418,421 B1 * | 7/2002 | Hurtado et al. | 705/54 |
| 6,425,081 B1 * | 7/2002 | Iwamura | 713/176 |
| 6,430,558 B1 * | 8/2002 | Delano | 1/1 |
| 6,442,285 B2 | 8/2002 | Rhoads et al. | |
| 6,449,367 B2 | 9/2002 | VanWie | |
| 6,477,707 B1 * | 11/2002 | King et al. | 725/97 |
| 6,491,217 B2 | 12/2002 | Catan | |
| 6,505,160 B1 | 1/2003 | Levy et al. | |
| 6,516,356 B1 * | 2/2003 | Belknap et al. | 719/328 |
| 6,522,770 B1 | 2/2003 | Seder et al. | |
| 6,542,927 B2 | 4/2003 | Rhoads | |
| 6,549,933 B1 | 4/2003 | Barrett | |
| 6,553,129 B1 | 4/2003 | Rhoads | |
| 6,560,339 B1 * | 5/2003 | Iwamura | 380/201 |
| 6,577,746 B1 | 6/2003 | Evans et al. | |
| 6,590,998 B2 | 7/2003 | Rhoads | |
| 6,636,249 B1 | 10/2003 | Rekimoto | |
| 6,658,568 B1 * | 12/2003 | Ginter et al. | 713/193 |
| 6,675,165 B1 | 1/2004 | Rothschild | |
| 6,681,028 B2 | 1/2004 | Rodriguez et al. | |
| 6,694,043 B2 | 2/2004 | Seder et al. | |
| 6,697,944 B1 * | 2/2004 | Jones et al. | 713/168 |
| 6,711,559 B1 * | 3/2004 | Kogota et al. | 1/1 |
| 6,775,392 B1 | 8/2004 | Rhoads | |
| 6,782,115 B2 | 8/2004 | Decker et al. | |
| RE38,600 E | 9/2004 | Mankovitz | |
| 6,786,397 B2 | 9/2004 | Silverbrook et al. | |
| 6,807,534 B1 | 10/2004 | Erickson | |
| 6,807,676 B1 | 10/2004 | Robbins | |
| 6,820,062 B1 | 11/2004 | Gupta et al. | |
| 6,829,368 B2 | 12/2004 | Meyer et al. | |
| 6,917,724 B2 | 7/2005 | Seder et al. | |
| 6,928,545 B1 * | 8/2005 | Litai et al. | 713/185 |
| 6,941,275 B1 | 9/2005 | Swierczek | |
| 6,947,571 B1 | 9/2005 | Rhoads et al. | |
| 6,965,682 B1 | 11/2005 | Davis | |
| 6,965,683 B2 | 11/2005 | Hein, III | |
| 6,965,873 B1 | 11/2005 | Rhoads | |
| 6,978,370 B1 * | 12/2005 | Kocher | 713/176 |
| 7,010,144 B1 | 3/2006 | Davis et al. | |
| 7,035,427 B2 | 4/2006 | Rhoads | |
| 7,050,603 B2 | 5/2006 | Rhoads | |
| 7,051,086 B2 | 5/2006 | Hannigan | |
| 7,058,697 B2 | 6/2006 | Rhoads | |
| 7,065,559 B1 | 6/2006 | Weiss | |
| 7,095,871 B2 | 8/2006 | Jones et al. | |
| 7,158,654 B2 | 1/2007 | Rhoads | |
| 7,171,016 B1 | 1/2007 | Rhoads | |
| 7,171,018 B2 | 1/2007 | Rhoads et al. | |
| 7,185,201 B2 | 2/2007 | Rhoads et al. | |
| 7,206,820 B1 | 4/2007 | Rhoads et al. | |
| 7,224,995 B2 | 5/2007 | Rhoads | |
| 7,233,948 B1 * | 6/2007 | Shamoon et al. | 1/1 |
| 7,248,717 B2 | 7/2007 | Rhoads | |
| 7,302,574 B2 | 11/2007 | Conwell et al. | |
| 7,308,485 B2 | 12/2007 | Roberts | |
| 7,333,957 B2 | 2/2008 | Levy et al. | |
| 7,349,552 B2 | 3/2008 | Levy et al. | |
| 7,362,781 B2 | 4/2008 | Rhoads | |
| 7,372,976 B2 | 5/2008 | Rhoads et al. | |
| 7,403,299 B2 | 7/2008 | Takahashi | |
| 7,760,905 B2 * | 7/2010 | Rhoads et al. | 382/100 |
| 7,792,325 B2 * | 9/2010 | Rhoads et al. | 382/100 |
| 8,051,295 B2 * | 11/2011 | Brunk et al. | 713/176 |
| 2001/0016836 A1 * | 8/2001 | Boccon-Gibod et al. | 705/51 |
| 2001/0021978 A1 | 9/2001 | Okayasu et al. | |
| 2001/0044824 A1 | 11/2001 | Hunter et al. | |

| | | | |
|---|---|---|---|
| 2002/0001395 A1 | 1/2002 | Davis et al. | |
| 2002/0015042 A1 | 2/2002 | Robotham et al. | |
| 2002/0027994 A1 | 3/2002 | Katayama et al. | |
| 2002/0054692 A1* | 5/2002 | Suzuki et al. | 382/100 |
| 2002/0062382 A1 | 5/2002 | Rhoads et al. | |
| 2002/0065832 A1* | 5/2002 | Mack | 707/104.1 |
| 2002/0069370 A1* | 6/2002 | Mack | 713/201 |
| 2002/0075298 A1 | 6/2002 | Schena et al. | |
| 2002/0080271 A1 | 6/2002 | Eveleens et al. | |
| 2002/0080396 A1 | 6/2002 | Silverbrook et al. | |
| 2002/0083123 A1 | 6/2002 | Freedman et al. | |
| 2002/0083124 A1* | 6/2002 | Knox et al. | 709/203 |
| 2002/0087885 A1* | 7/2002 | Peled et al. | 713/201 |
| 2002/0095577 A1* | 7/2002 | Nakamura et al. | 713/176 |
| 2002/0102966 A1 | 8/2002 | Lev et al. | |
| 2002/0114488 A1* | 8/2002 | Suda | 382/100 |
| 2002/0152388 A1 | 10/2002 | Linnartz et al. | |
| 2002/0162118 A1* | 10/2002 | Levy et al. | 725/110 |
| 2002/0172394 A1* | 11/2002 | Venkatesan et al. | 382/100 |
| 2002/0188841 A1 | 12/2002 | Jones et al. | |
| 2003/0007662 A1* | 1/2003 | Kaars | 382/100 |
| 2003/0014496 A1* | 1/2003 | Spencer et al. | 709/217 |
| 2003/0021441 A1 | 1/2003 | Levy et al. | |
| 2003/0040326 A1 | 2/2003 | Levy et al. | |
| 2003/0068067 A1* | 4/2003 | Fielding et al. | 382/100 |
| 2003/0083098 A1 | 5/2003 | Yamazaki et al. | |
| 2003/0123659 A1 | 7/2003 | Forstrom et al. | |
| 2003/0187798 A1 | 10/2003 | McKinley et al. | |
| 2004/0015362 A1 | 1/2004 | Rhoads | |
| 2004/0202348 A1* | 10/2004 | Kuzma | 382/100 |
| 2005/0028189 A1 | 2/2005 | Heine et al. | |
| 2005/0091268 A1 | 4/2005 | Meyer | |
| 2005/0213790 A1* | 9/2005 | Rhoads et al. | 382/100 |
| 2006/0041591 A1 | 2/2006 | Rhoads | |
| 2006/0136565 A1 | 6/2006 | Rhoads | |
| 2006/0174348 A1 | 8/2006 | Rhoads et al. | |
| 2007/0185840 A1 | 8/2007 | Rhoads | |
| 2007/0189533 A1 | 8/2007 | Rhoads | |
| 2007/0192872 A1* | 8/2007 | Rhoads et al. | 726/26 |
| 2007/0274561 A1* | 11/2007 | Rhoads et al. | 382/100 |
| 2007/0276928 A1* | 11/2007 | Rhoads et al. | 709/219 |
| 2010/0045816 A1* | 2/2010 | Rhoads | 348/222.1 |
| 2010/0293106 A1* | 11/2010 | Rhoads et al. | 705/330 |
| 2011/0019001 A1* | 1/2011 | Rhoads et al. | 348/158 |
| 2011/0066658 A1* | 3/2011 | Rhoads et al. | 707/803 |

FOREIGN PATENT DOCUMENTS

| | | |
|---|---|---|
| EP | 0581317 | 2/1994 |
| EP | 0642060 | 3/1995 |
| EP | 1049320 B1 | 1/2003 |
| JP | 4-335480 | 11/1992 |
| JP | 5-037795 | 2/1993 |
| JP | 08-50598 | 2/1996 |
| JP | 3949679 | 7/2007 |
| WO | WO9400842 | 1/1994 |
| WO | WO9510813 | 4/1995 |
| WO | WO97/43736 | 11/1997 |
| WO | WO9743736 | 11/1997 |
| WO | WO9904568 | 1/1999 |
| WO | WO0115021 | 3/2001 |
| WO | WO0211446 | 2/2002 |

OTHER PUBLICATIONS

Rhoads et al., U.S. Appl. No. 09/571,422, filed May 15, 2000.
Rhoads et al., U.S. Appl. No. 09/476,686, filed Dec. 30, 1999, and Office Action dated Oct. 4, 2004.
Ramos et al, U.S. Appl. No. 60/191,778, filed Mar. 24, 2000.
Davis et al, U.S. Appl. No. 60/198,857, filed Apr. 21, 2000.
Levy et al., U.S. Appl. No. 60/232,163, filed Sep. 11, 2000.
Jones et al., U.S. Appl. No. 60/282,205, filed Apr. 6, 2001.
Ramos et al, U.S. Appl. No. 09/636,102, filed Aug. 10, 2000.
Rhoads et al, U.S. Appl. No. 09/531,076, filed Mar. 18, 2000, plus Office Action of May 6, 2005, and Amendment dated Sep. 6, 2005.
Rhoads et al, U.S. Appl. No. 09/547,664, filed Apr. 12, 2000, with final Office Action dated Mar. 4, 2005, first appeal brief dated Oct. 7, 2004, and second appeal brief dated Feb. 28, 2005.
Davis et al., U.S. Appl. No. 09/697,009, filed Oct. 25, 2000, plus final office Action dated Apr. 26, 2005.

Bender et al., "Techniques for data hiding," Proc. SPIE, vol. 2420, pp. 164-173, 1995.
Berners Lee, RFC1738, Uniform Resource Locators, Dec. 1994, 25 pages.
Mackay et al, "Video Mosaic: Laying Out Time in a Physical Space," Proc. of Multimedia '94, 8 pp.
Matsutani, "The Construction of Copyright-Protected Image Data Technical Report of IEICE," ISEC94-58, pp. 59-68, 1995. (This Matsutani document is erroneously cited as "Matsuya, 'Method of Composing Document and Image Data having Copyright Protection Function,' Report on Technical Study of the Institute of Electronics, Information and Communication Engineers, ISEC94-58, Mar. 17, 1995, pp. 59-68" on p. 3 of the below cited Mar. 24, 2006 Notice of Reason(s) for Rejection in the JP 2004-224727 application.).
Mar. 31, 2008 Notice of Allowance (including Examiner's search history), and Feb. 21, 2008 Amendment, each from assignee's U.S. Appl. No. 11/265,544 (published as US 2006-0136565 A1).
Sep. 28, 2001 Examination Report from the European Paten Office; Feb. 6, 2002 Response thereto; May 9, 2000 European Search Report; and claims as originally filed, each from assignee's European patent application No. 00116604.0—now EP 1049320 B1.
Allowed Claims from assignee's Japanese patent application No. 2004-224727 (published as JP 3949679); and Mar. 24, 2006 Notice of Reason(s) For Rejection (English Translation) in the JP 2004-224727 application.
Kageyama et al, Melody Retrieval with Humming, Proceedings of Int. Computer Music Conference (ICMC), 1993.
Wagner, Fingerprinting, IEEE Proc. Symp. on Security and Privacy, pp. 18-22, 1983.
Wold et al, Content-Based Classification, Search, and Retrieval of Audio, IEEE Multimedia Magazine, Fall, 1996.
Johnson, et al., "Bridging the Paper and Electronic Worlds: The Paper User Interface", Interchi '93, pp. 507-512, Apr. 1993.
Whittaker, et al., "Back to the Future: Pen and Paper Technology Supports Complex Group Coordination," CHI '95, Conference on Human Factors in Computing Systems, Denver, Colorado (May 7-11, 1995) (text copy obtained from ACM).
Peairs, "Iconic Paper," Proceedings of the Third International Conference on Document Analysis and Recognition (ICDAR '95), pp. 1174-1179, 1995.
Newman, William, et al. "A Desk Supporting Computer-Based Interaction with paper Documents," ACM Conference on Human Factors in Computing Systems (CHI '92) May 3-7, 1992, pp. 587-592.
Rao, et al., "Protofoil: Storing and Finding the Information Worker's Paper Documents in an Electronic File Cabinet," Human Factors in Computing Systems (CHI '94), pp. 180-186, Boston, MA, Apr. 1994.
Zhao, et al., "Embedding Robust Labels into Images for Copyright Protection," Proceedings of International Congress on Intellectual Property Rights for Specialized Information, Knowledge and New Technology, Aug. 21, 1995.
U.S. Appl. No. 09/507,096, filed Feb. 17, 2000.
U.S. Appl. No. 09/476,686, filed Dec. 30, 1999.
U.S. Appl. No. 09/479,304, filed Jan. 6, 2000.
U.S. Appl. No. 10/823,997, filed Apr. 13, 2004.
U.S. Appl. No. 12/116,645, filed May 7, 2008.
Nov. 18, 2005 Communication and Sep. 18, 2000 Communication, each from the European Patent Office in Assignee's European Application No. 97924752.5. (EP counterpart of WO9743736, previously cited).
May 26, 2006 Response to the Nov. 18, 2005 Communication from the EPO in Assignee's European Patent Application No. 97924752.5 (allowed). (EP counterpart of WO9743736, previously cited).
Jun. 6, 2007 Summons to attend oral proceedings, and Dec. 20, 2007 Response thereto, each from the European Patent Office in Assignee's European Patent Application No. 97924 752.5 (allowed). (EP counterpart of WO9743736, previously cited).
U.S. Appl. No. 09/574,726 Final Rejection mailed Apr. 15, 2008, Response filed Jul. 15, 2008 and Notice of Panel Decision mailed Aug. 1, 2008.
U.S. Appl. No. 09/636,102 Amendment filed Jun. 22, 2007 and Final Rejection mailed Jul. 18, 2008.

U.S. Appl. No. 10/090,775 Notice of Allowance mailed Jun. 6, 2008, Appeal Brief filed May 3, 2007 and Final Rejection mailed Aug. 4, 2006.

U.S. Appl. No. 09/531,076 Office Action mailed Jan. 25, 2008, Amendment dated Apr. 25, 2008, and Final Rejection mailed Aug. 6, 2008.

* cited by examiner

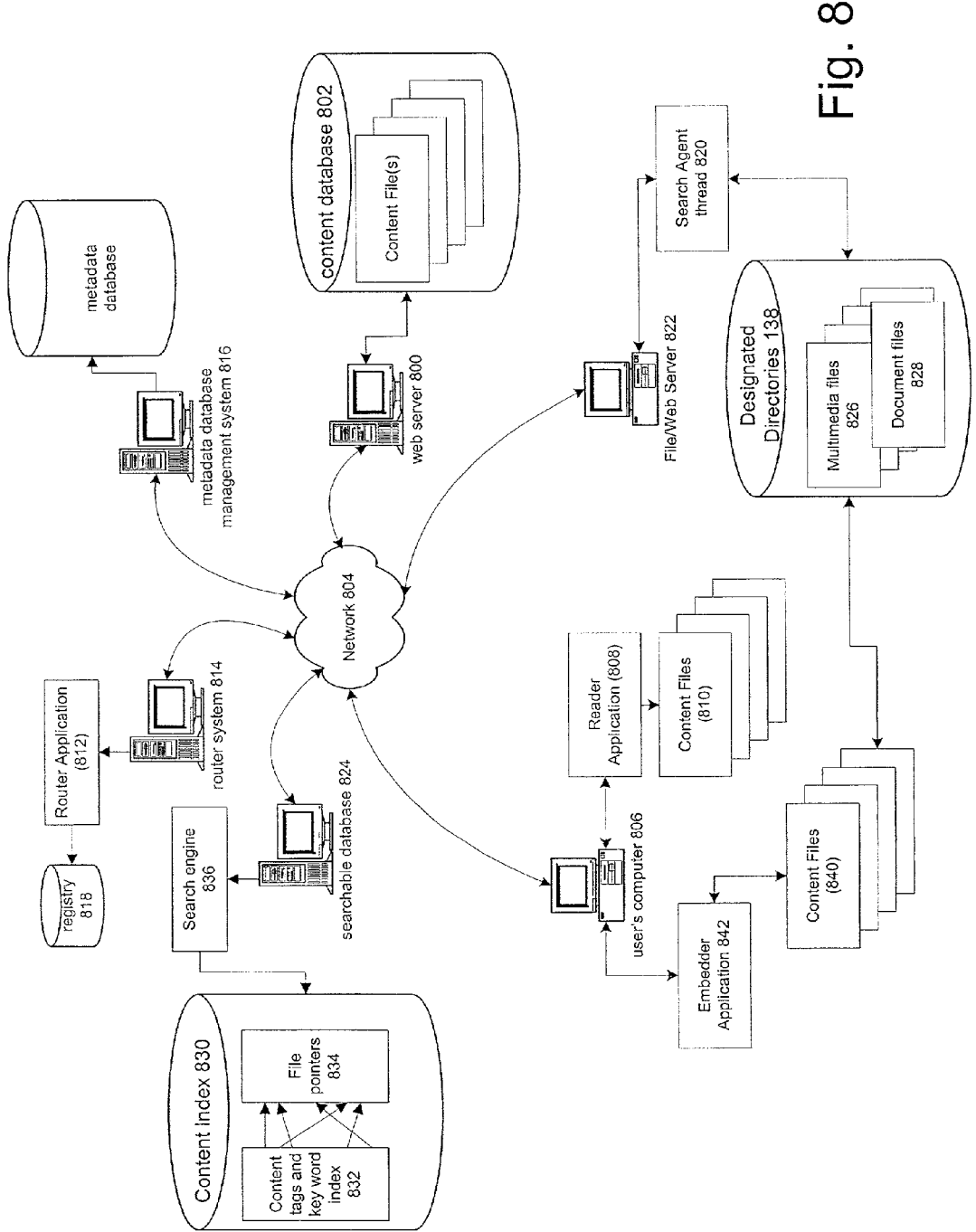

CONTEXT SENSITIVE CONNECTED CONTENT

RELATED APPLICATION DATA

This patent application is a continuation in part of U.S. patent application Ser. No. 09/636,102, filed Aug. 10, 2000, now abandoned which claims priority to U.S. Provisional Application No. 60/191,778, filed Mar. 24, 2000, which is hereby incorporated by reference.

This patent application also claims priority to U.S. Provisional Application 60/232,163, filed Sep. 11, 2000, which is hereby incorporated by reference.

This patent application also claims priority to U.S. Provisional Application 60/282,205, filed Apr. 6, 2001, which is hereby incorporated by reference.

This application also is a continuation in part of applications Ser. No. 09/165,142 filed Oct. 1, 1998 (Now U.S. Pat. No. 6,421,070), Ser. No. 09/503,881, filed Feb. 14, 2000 (Now U.S. Pat. No. 6,614,914), Ser. No. 09/507,096, now abandoned filed Feb. 17, 2000, Ser. No. 09/526,982, filed Mar. 15, 2000 (Now U.S. Pat. No. 6,516,079), Ser. No. 09/531,076, now U.S. Pat. No. 8,180,844 filed Mar. 18, 2000, and Ser. No. 09/620,019, filed Jul. 20, 2000, now U.S. Pat. No. 7,689,532 which are hereby incorporated by reference.

This patent application is also related to. U.S. patent applications Ser. No. 09/525,865 entitled Integrating Digital Watermarks into. Multimedia Content filed Mar. 15, 2000 (Now U.S. Pat. No. 6,611,607), Ser. No. 09/563,664 entitled Connected Audio and Other Media Objects filed May 2, 2000 (Now U.S. Pat. No. 6,505,160), Ser. No. 09/571,422 entitled Methods and Systems for Controlling Computers or Linking to Internet Resources from Physical and Electronic Objects filed May 15, 2000 (Now. U.S. Pat. No. 6,947,571), and Ser. No. 09/574,726, entitled Methods and Systems Employing Digital Watermarking filed May 18, 2000, which are hereby incorporated by reference.

TECHNICAL FIELD

The invention relates to methods for associating multimedia signals with related data using identifiers associated the signals.

BACKGROUND AND SUMMARY

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

A great number of particular watermarking techniques are known. The reader is presumed to be familiar with the literature in this field. Particular techniques for embedding and detecting imperceptible watermarks in media signals are detailed in the present assignee's copending application Ser. No. 09/503,881 (Now U.S. Pat. No. 6,614,914). Other watermarking techniques are known from published patents to NEC (inventor Cox et al), IBM (inventors Morimoto and Braudaway et al), Dice (inventor Cooperman), Philips (inventors Kalker, Linnartz, Talstra, etc. Audio watermarking techniques are known from published patents to Aris (inventor Winograd, Metois, Wolosewicz, etc.), Solana (inventor Lee, Warren, etc.), Dice, AudioTrack, Philips, etc.

The invention provides a method of connecting multimedia content to a network resource. This method operates in a computer network environment. Operating in a network connected device, the method extracts an identifier from a media signal, such as from a digital watermark, perceptual hash, or other machine extracted signal identifier. It then sends the identifier to a network along with context information indicating device type information. From the network, the method receives related data associated with the media signal via the identifier. The related data is adapted to the network connected device based on the device type information. This device type information may include a display type, so that the related date may be formatted for rendering on the display type of the device. This device type information may also include a connection speed so that the related data may be optimized for the connection speed of the device.

Further features of the invention will become apparent with reference to the following detailed description and accompanying drawings.

BRIEF DESCRIPTION OF DRAWINGS

FIG. 8 illustrates a system for enhancing digital asset management by linking media content with metadata and actions associated with the content.

DETAILED DESCRIPTION

Introduction

Figure 1:
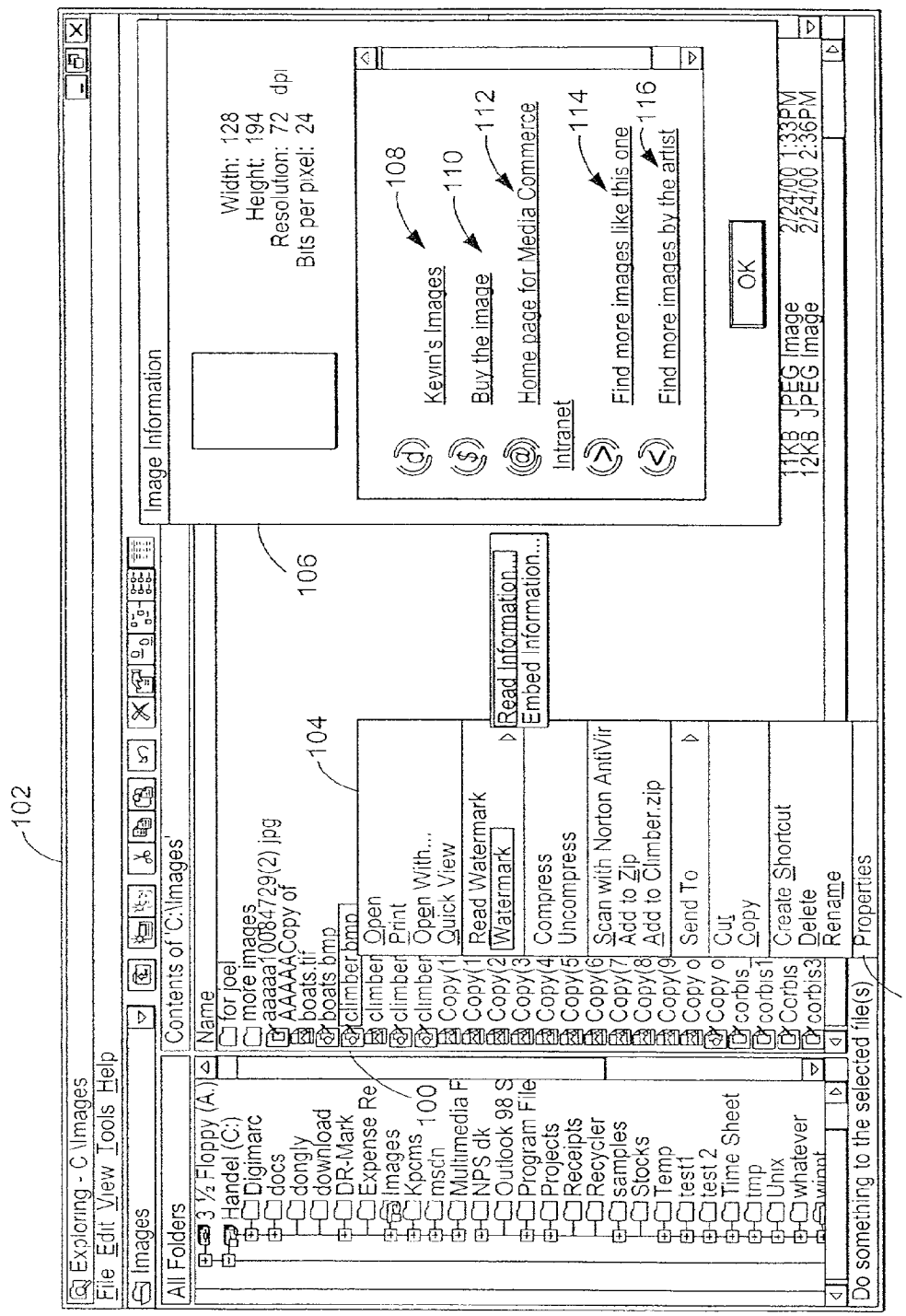
FIG. 1 is an example of user interface features enabled by integrating a watermark decoder in an operating system or other application program.

A watermark may be used to associate a media object such as an image, video or audio file to additional information and actions. The watermark can associate the media object with metadata or processing actions encoded within or stored outside the media object. Metadata may be encoded in a watermark message, stored within the media object file, or stored outside the media object file. When metadata is stored outside the media object, the watermark may encode an imperceptible and persistent link to this metadata, such as an object identifier (number, address, index, pointer, etc.) within the media object. Wherever the media object travels, watermark decoder-enabled software or devices can extract the watermark from the media signal, and access the metadata or actions associated with the object via the watermark link.

The specific infrastructure for retrieving metadata or actions associated with a media object via its watermark may vary. The metadata or processing actions may reside in a metadata database in the same device or system as the media object, or in a remote device or system accessible via a wire or wireless network. In a distributed computing environment like the Internet, one way is to implement a database server that takes a object identifier extracted from a watermark message and performs one or more tasks associated with the identifier, such as returning metadata or URL links to a requesting computer or device ("client"), routing the identifier to another server, executing some program or set of programs, etc. The watermark message refers to the auxiliary data encoded into a host media object via the watermark.

The following sections summarize ways to take advantage of this functionality in an operating system, Internet browser, and other applications (whether implemented in hardware devices, software, or a combination of hardware and software).

Integrating a Watermark Decoder in Operating Systems and Other Applications

In Operating System

A watermark decoder may be integrated in a file browser component of an operating system. The decoder enables the file browser to extract a watermark and retrieve metadata for watermark enabled media objects. As the user browses files, the watermark decoder may operate as a foreground or background task, automatically or user-initiated, to detect a watermark. Finding a watermark, the browser annotates its representation of the media object as directed by the application(s) associated with the watermark. Depending on the implementation, the browser may proceed to retrieve additional information or actions associated with the object via the watermark and annotate its representation of the media object accordingly. For example, the browser may annotate the media object with a description of information or actions linked via the watermark (e.g., a brief description and/or http link), or may annotate the object with the actual information or actions.

The process of detecting a watermark and referencing information or actions via the watermark may be implemented to be transparent to the user. For example, the file browser displays information or options obtained via the watermark link without requiring the user to intervene in the watermark detection or information retrieval process.

Alternatively, the file browser can give the user the opportunity to control various stages of watermark detection and processing triggered by the watermark payload. For instance, the user may be given the option to allow the watermark decoder to operate on media objects, and to determine whether and how actions triggered by the watermark payload should proceed. Upon detection of a watermark, for example, the media object can be annotated with an indicator, such as a distinctive sound or logo, that informs the user that information and actions can be accessed via a link embedded in the watermark. The user has the option to access additional information associated with the media object by, for example, selecting a visual logo associated with the object in the user interface. An audio "logo" may be played when the user selects the object (e.g., passes a cursor over its graphical representation in the user interface).

The user interface of the application can be annotated with a variety of graphical and/or audio effects that inform the user of the presence of the watermark link and associated information and actions. Changes in the user interface may be used to convey different stages in the watermark detection and metadata retrieval process. For example, when it first detects the presence of a watermark, the decoder (or host application) plays a generic indicator, such as a simple logo or audio clip. Then, when the appropriate metadata server returns metadata and/or instructions linked via the watermark, the user interface presents specific information associated with the object.

The server may return program code, such as Java Applets, Visual Basic script, XML or some other set of instructions, that present information to the user and provide links to additional information and actions (e.g., URLs or hot links to web sites, other content or program code). Upon receiving this code, a client computer or device executes it. The client typically is the computer or device that decoded the watermark link and issued a request based on the link to the server. This code may perform a variety of functions, including controlling rendering of the watermarked media object and related media objects, some of which may be returned with the linked metadata. The server may return code to control decoding or decrypting the media object or other related media signals to be played along with the watermarked media object. In addition, the server may return code and/or links to enable the user to establish a license and obtain usage rights electronically with a licensing program executing locally and/or on a remote licensing computer (e.g., a licensing server on the Internet).

The server may return data, such as XML, that defines actions to be taken (by providing URLs, instructions, etc.). The client computer or device receiving such a definition of actions may execute the action or present them to the user as options to be executed in response to user input (e.g., clicking on a graphical representation of the option in the user interface of a computer, responding to voice commands via a speech recognition engine, etc.).

The user can access linked information or actions by selecting a graphical representation of the object in a user interface. For example, the user can "click-on" an icon representing the object, or a rendered version of the object (e.g., an image) to determine whether metadata or actions are linked to the object, or to initiate a linked action or retrieval of the metadata.

The watermark decoder may be designed to search for the presence of watermarks in media objects in a specified location (e.g., directories, hard drive, etc.) in response to an event, at periodic intervals, or in response to a user request. For instance, the watermark decoder may be implemented as a utility service, similar to a file search utility, that the user may invoke to a extract watermark link from a media object file, or from a group of files. As another example, the operating system can be designed to invoke the decoder at boot up on all files of a given type in a selected storage location (e.g., on the hard drive). The operating system may also run the decoder as a background utility to periodically check for watermark links in media objects. A timer or clock service may be used to trigger watermark detection when the timer elapses or at predetermined time intervals. The operating system may also run the decoder when prescribed events happen, such as downloading a file, saving a file, etc. Triggering the decoder in response to such events enables the operating system to ensure that media objects are checked whenever they enter the system or device in which the operating system is executing, and whenever they are edited.

To improve the efficiency of the watermark decoder, the file system may implement a scheme for tracking when and which media objects have been checked for watermarks. One such scheme is to assign attributes to each media object to indicate whether it has been checked, whether or not it is watermarked, and if so, when the watermark was detected. Then, the decoder uses this information to check only media objects that have not been checked or have been modified, or for media objects for which a given period of time has elapsed since the last check. Each time a media object is modified, the attribute indicating that the mark has been checked may be reset to ensure that only new and modified objects are re-checked.

To illustrate the concept, consider an implementation in the Windows Operating System. FIG. 1 illustrates an example of an extension of the Windows Explorer user interface to support watermark embedding and reading of media objects. Media object files are typically represented as icons 100 in the user interface 102 of the Windows Explorer file browser. By right clicking the mouse while positioning a cursor over the file icon 100, the user can access a context menu 104 of options associated with the selected media object.

This "watermark aware" file browser augments the options of the context menu by listing options such as "Read Watermark" or "Watermark." When the user positions the cursor over the "Read Watermark" option, the operating system invokes a watermark decoder on the media object. The watermark decoder extracts the watermark link and acts in concert with network communication software to access the metadata database and retrieve the items from the database associated with the watermark link. The file browser displays these items in a window 106.

There are a variety of ways to access the metadata database. The metadata may be stored locally (in the same machine as the media object), in a local area network or a wide area network. If the database is located on a remote computer on a computer network, such as the Internet, network communication software may be used to establish a connection with the database.

When selected, the "Watermark" option displays further options for reading and embedding information ("Read Information . . . " and "Embed Information . . . "). The window labeled Image Information 106 displays metadata and actions associated with an image via a watermark link embedded in it. In this example, the window 106 displays a thumbnail of the image, image attributes (e.g., width, height, resolution, bits per pixel), and a series of HTML links 108-116 to additional information and actions (such as a search for related images at links 114, 116).

Figure 2:
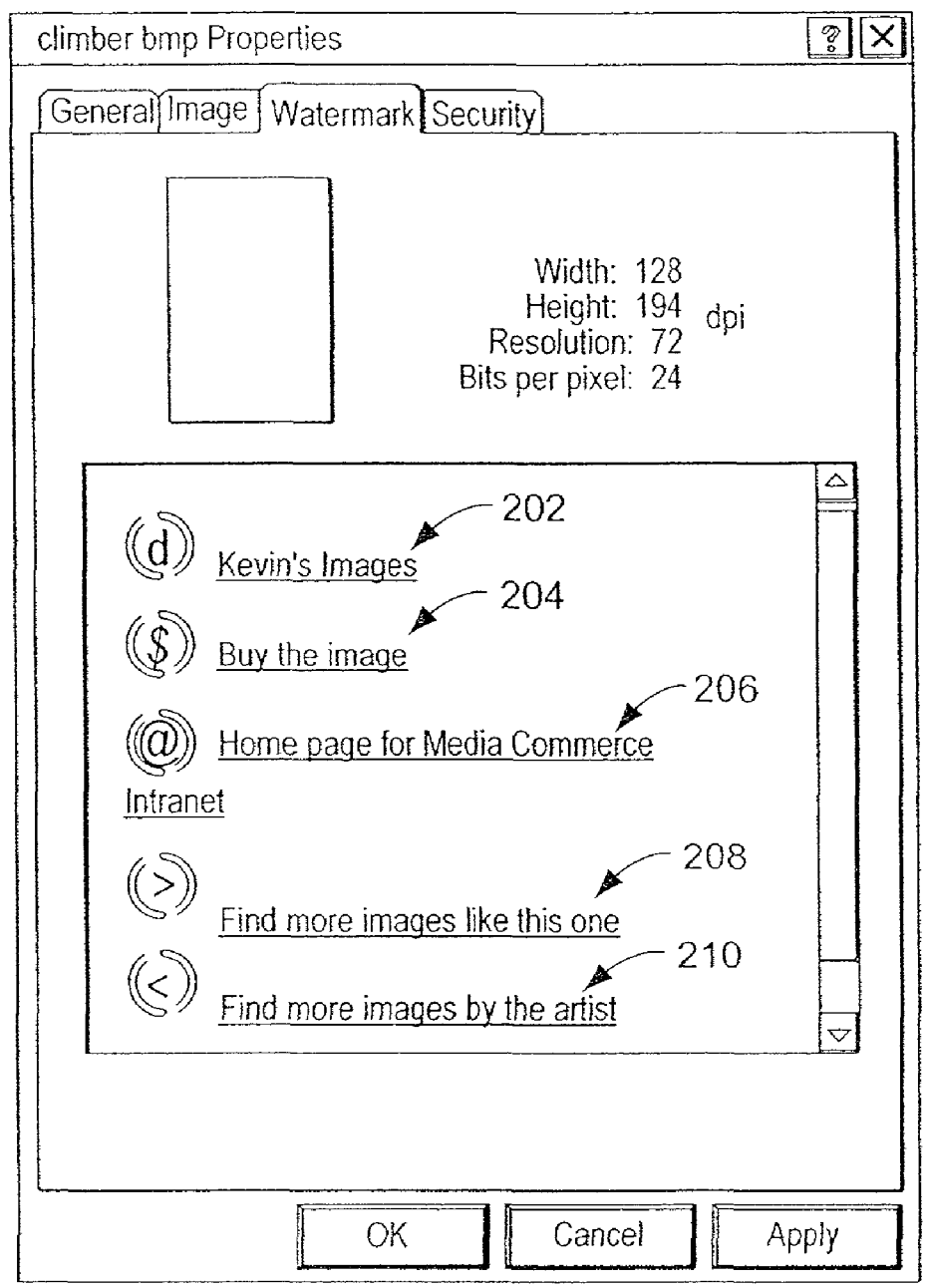
FIG. 2 is an alternative implementation of a user interface for displaying metadata in the file browser of FIG. 1.

Another way to display items linked via a watermark is to insert them in an additional property page as shown in FIG. 2. While executing the file browser, the user accesses properties (option 118 in FIG. 1) by right clicking the mouse while positioning the cursor over the media object's icon. In response to selecting properties, the operating system displays a properties window such as the one shown in FIG. 2. Each of the property pages associated with the media object has a tab (e.g., General, Image, Watermark, Security). The Watermark page is selected in FIG. 2. Like the options displayed in the window 106 of FIG. 1, the Watermark page lists a series of HTML links 202-210 to additional information or actions. When selected, the link invokes an Internet browser to retrieve information at the underlying URL. For actions like searches 208-210, the link may pass additional parameters such as attributes of the media object to the server at the URL, which in turn, executes a search using those parameters and returns the results to the Internet browser.

An additional way to reflect that a file includes watermarked data is to superimpose a graphical "watermark indicator" icon to the file's icon to signify the presence of a watermark in the file.

While the implementation may vary, the examples depicted in FIGS. 1 and 2 are shell extensions of the Windows Explorer file browser. The decoder is implemented as a COM object client of the Windows Explorer. The COM object client is registered with the operating system as a shell extension handler. FIG. 1 depicts a context menu handler, while FIG. 2 depicts a properties page handler.

Another possible implementation is to implement a shell extension that uses a shell execute command to launch a metadata retrieval application that gets and displays metadata options. This implementation adds an extension to the file browser user interface, such as a context menu extension. When the user selects a media file object within the file browser user interface, it displays a context menu with an option to launch the metadata retrieval program associated with media objects of a given type. A number of actions can be tied to this option. One action is to launch the metadata retrieval application program. Another action is to launch a media player to play the selected option. Of course, both actions can be initiated concurrently in a multitasking operating system.

One example of a metadata retrieval application is a watermark decoder that extracts a watermark message, and forwards an object identifier from the message to a metadata server, which then returns metadata. As noted above, the retrieval application need not extract the object identifier from a watermark if it was already extracted and used recently to retrieve metadata. Instead, the retrieval application can proceed to display the metadata and actions to the user.

To launch the retrieval application, the shell execute command passes the name and location of the media object to the retrieval application. The retrieval application may present its own user interface to display linked metadata and actions, or may pass them to the file browser, which then displays them within an extension such as a properties page or context menu extension. The retrieval application may prompt the user to request permission before decoding a watermark or requesting an update of metadata from the metadata server. Additionally, the retrieval application may launch one or more other applications, such as an Internet browser to issue a request for metadata from a Web server and display metadata and actions in an HTML document returned from the server.

The approaches described above can be implemented for a variety of media object files, including image, video and audio files. Also, the object identifier need not be inserted in a watermark, but instead may be placed somewhere else in the media object file, such as a file header.

In Browser

The watermark decoder may also be integrated into an Internet browser application. Like the file browser, an Internet browser can browse directories of files in a local computer or across a network. Commercially available browsers like Internet Explorer from Microsoft Corporation and Netscape Navigator typically support transfer protocols like HTTP and FTP, and have additional components for interpreting or compiling code, including HTML, Java, Visual Basic and scripts (e.g., Java scripts, Visual Basic scripts, etc.). In addition, Internet browsers can parse and render HTML for display in a computer or other device's user interface.

To illustrate integrating a watermark decoder in an Internet browser, consider the following example. As the Internet browser downloads and parses web pages with media objects on the Internet, it keeps a listing of these objects, and checks them for the presence of a watermark. In the listing, it annotates the representation of the objects with watermarks to reflect the presence of the watermark, and potentially other data such as a URL where the media object originated. The user may access the listing by viewing an application window (e.g., an application bar) that presents a visual representation of the media objects. For images, one way to represent the media object is through the use of a thumbnail of the image. Images and other objects may be represented as a graphical icon, textual description, or both.

Watermark objects may be distinguished with a visual or audio indicator like a distinctive sound or logo. The user views the metadata or actions associated with a media object by selecting the representation of the watermark-enabled object in some fashion. For example, the user can click on the thumbnail, icon, logo, or textual description to access a menu of metadata or actions linked to the object via the watermark.

Another way to indicate watermarked objects is to alter the appearance of a cursor in a graphical user interface of the software application when the user passes the cursor over the watermarked object or a representation of the object displayed in the graphical user interface. One way to alter the cursor is to change it from a conventional pointer to a distinctive graphical icon associated with the detected watermarked object type. Another way is to animate the cursor such that it morphs into some other shape or graphical design over a sequence of frames. Similarly, the user interface can alter the appearance of the watermarked object as the user passes the cursor over it. In addition, the user interface can produce a distinctive sound when the user passes the cursor over the object to signify that it includes a watermark.

U.S. patent application Ser. No. 09/165,142 (Now U.S. Pat. No. 6,421,070) provides an example of how to decode watermarks from images in HTML pages and annotate the images with a logo indicating that a watermark is present. It describes a way to present a representation of media objects (thumbnails of images) in an application window of a browser. One such application window may be used to display thumbnails of images to present a history of images encountered while browsing web pages on the Internet or elsewhere. The user may click on an image to add it to a separate "bookmark" or "favorites" list. Another application window may be used to display thumbnails of the images in this bookmark list. By selecting an image or a representation of it, the browser links to a network resource associated with the selected image (e.g., via an associated URL). This network resource may be a web page where the image. originated. Alternatively, the resource may be a web page referenced via the watermark link embedded in the image. The watermark message may encode a URL or an object identifier that is used to look up a URL of a network resource, such as a web page. For example, the URL might link to the web page of an owner, or to a licensing server.

The methods described in U.S. patent application Ser. No. 09/165,142 (Now U.S. Pat. No. 6,421,070) may be applied to other media objects like video and audio signals.

Figure 3:
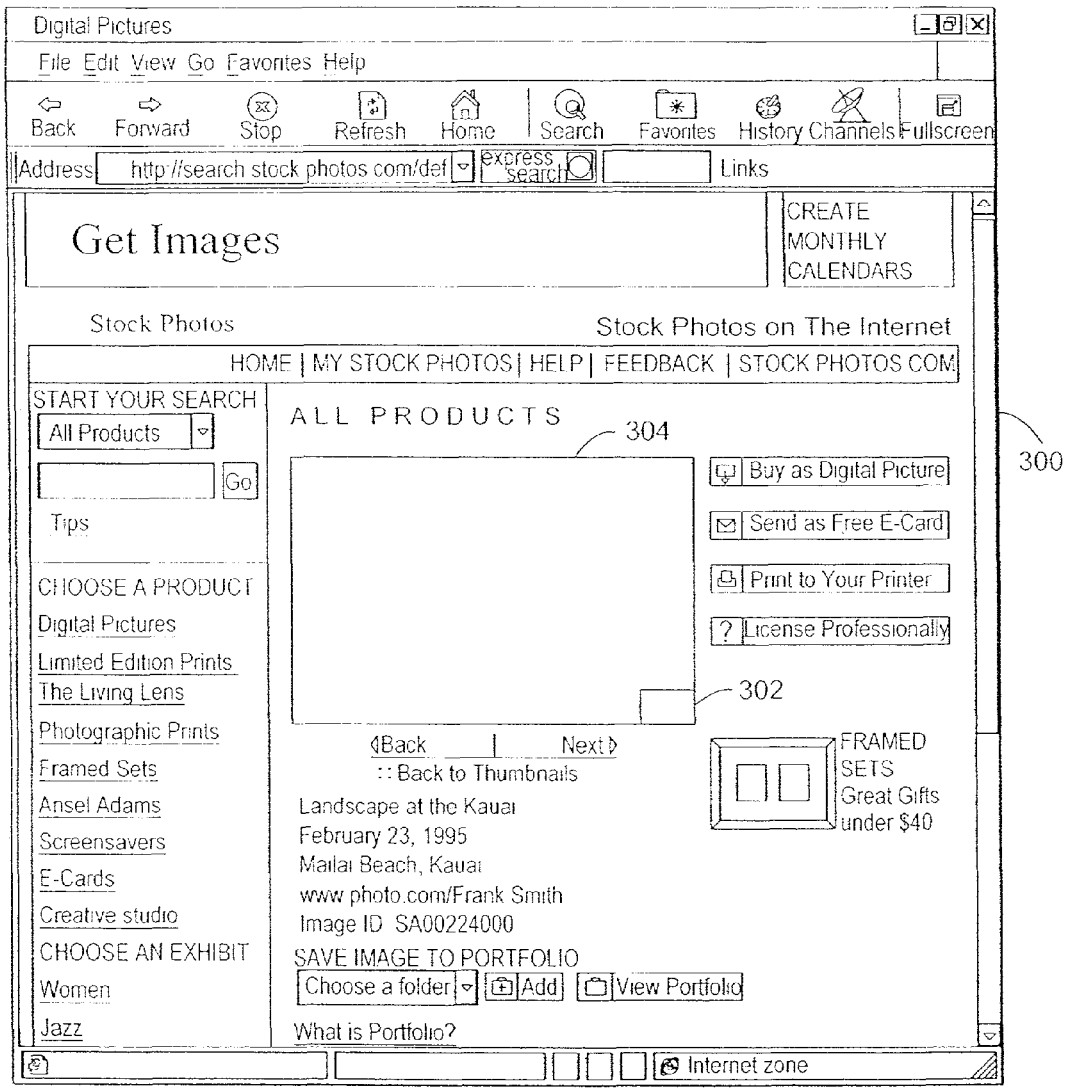
FIG. 3 is an example of user interface features enabled by integrating a watermark decoder in an Internet browser.

One way to allow the user to access metadata and actions linked to a media object via a watermark is to display them in a menu in the user interface of the Internet browser. FIG. 3 shows an example of how to display metadata and actions associated with a media object in the user interface 300 of an Internet browser. A browser listener program receives events from the Internet browser indicating when a web page has been downloaded. The listener requests from the browser the address or addresses of media objects in the web page. The address indicates where the media object resides in memory (main memory, virtual memory, cache, etc.). The listener invokes a watermark decoder on the media object or objects, passing it the address of the object in memory.

Finding a watermark, the listener inserts a handler program into the web page in memory. This handler program is responsible for presenting a logo or other indicator to the user indicating the presence of the watermark and providing hot links to information and actions. For example, the indicator in FIG. 3 is a logo 302 superimposed over a rendered version 304 of a watermarked image object in the browser's user interface.

Figure 4:
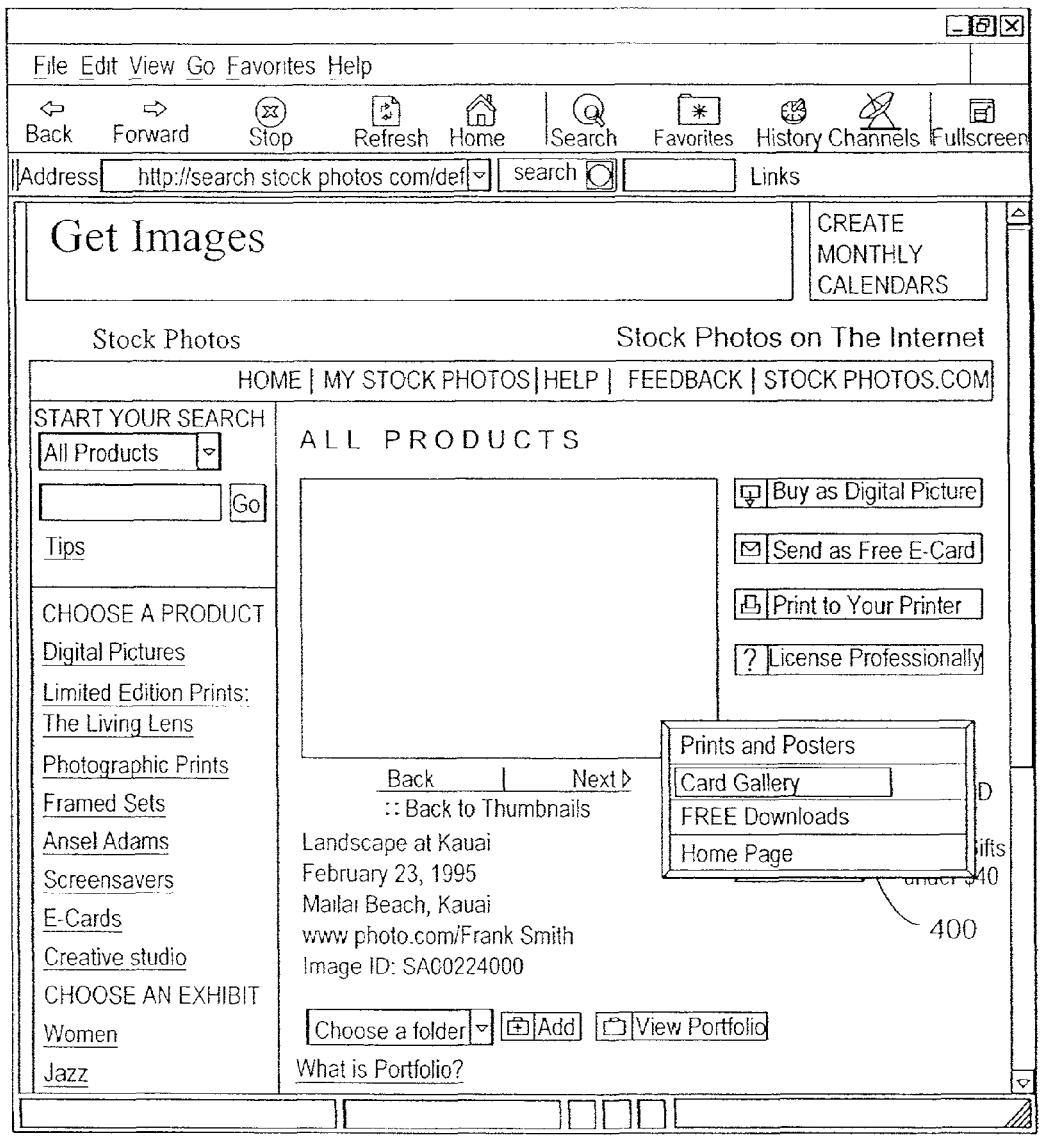
FIG. 4 shows the example of FIG. 3 with an expanded menu of options linked to a media object via a watermark.

When the user passes the cursor over a logo and selects it, the handler program associated with it displays a menu 400 of options as shown in FIG. 4. The listener program retrieves these options by establishing a connection to a metadata server (e.g., a local or remote database), passing an object identifier extracted from the watermark to the server, and receiving associated items from the server. These items may include URL links to web pages related to the media object, information about the media object, or links to an action, such as licensing server.

While specific implementations may vary, the example depicted in FIGS. 3 and 4 is implemented using document view extensions to the Internet Explorer browser from Microsoft Corporation. Microsoft's dynamic HTML provides an interface that allows an Internet Explorer listener program to insert code to modify an HTML document. Using this interface, the listener program inserts a Java script that controls the display and responds to input to the logo superimposed on the image shown in FIG. 3.

In some applications, media content and web site developers may wish to selectively enable or disable functionality associated with a watermark link. One way to implement this feature is to modify the media object file or some other file that acts as a container of a media object (e.g., an HTML) to include a control parameter (like a flag in a header file). This control parameter indicates the presence of a watermark enabled media object and whether the watermark link is enabled or disabled. The control parameter may be designed to default to being active, unless expressly turned off, or vice-versa. When content developers include the object in some multimedia work, such as a website, they can opt to disable the watermark link via the control parameter. Editing tools and other application programs and devices can be designed to turn the flag on unless expressly instructed to disable the watermark link.

In other applications, it is important that the watermark act as a persistent link to associated metadata. As the media object travels through different systems, gets coded/decoded, gets modified, etc., it may lose conventional metadata stored in the media object file. In these cases, the watermark link may be used to restore the metadata because the watermark is robust to various forms of transformations (e.g., digital to analog conversion, analog to digital conversion, compression, etc.).

Another way to selectively control functionality made available via the watermark is to enable the user to enable or disable watermark decoding on media objects.

The watermark can also be used as an attribute to the browser's file cache system. This allows cache browser applications to identify which cached files are watermarked and perform functions associated with the information embedded in the watermark as described throughout this document.

In Other Applications

The features outlined above can be implemented in any software applications or devices that process media objects. For example, a media object database management system may implement similar functionality. Digital asset management and digital rights management systems may use watermark enabled links to track and control the use of media objects.

Other applications that encounter media objects, like Word processing, spreadsheet, presentation programs, media object editing tools, etc. can all use some version of the features outlined above to link media objects with additional information and actions.

Many application programs have file browser capabilities that can be enhanced using the technology described in this document. For example, the File Open command is often used to browse file objects. The context menu and properties page extensions described above can be implemented for applications that provide file browsing services.

Watermark encoding and decoding functions can also be integrated into file sharing systems, such as the peer to peer file sharing systems like Napster, Gnutella, Freenet, Scour, etc. In a file sharing system, file sharing software executes on a number of client computers interconnected on a computer network. This software tracks the files available for sharing in the computer in which it executes, as well as other computers interconnected via the network. File sharing software may use watermarks or other forms of embedded data in files to control file transfers (uploading and downloading files on the computer), verify that a file is complete and free of viruses, carry metadata that may be used to search for files in the file sharing system, carry links to additional information and opportunities to obtain usage rights or to buy intellectual property rights in the file, or related products or services. To access this functionality, the file sharing software includes watermark or other embedded data decoding software. To insert or alter this functionality, the file sharing software includes watermark or other embedded data encoding software. For more information on this application, see U.S. patent application Ser. No. 09/620,019, filed Jul. 20, 2000, and entitled Using Embedded Data with File Sharing which is incorporated by reference above.

Context Sensitive Watermark Links

The actions or information linked to a media object via a watermark may be context sensitive. Some examples of "context" include application context (e.g., referring to the application program that is operating on the object), the object location context (where the object resides relative to the user). For example, the behavior of the link may be different when the user is manipulating the object in an editing tool as opposed to inserting the object in a document, such as a word processing document, a spreadsheet, or presentation. Also, the behavior of the watermark link may change based on whether the object is local, in an intranet, or on the Internet, relative to the user.

The decoder application may link to different metadata or processing actions depending on the context of the media object. To implement this functionality, the watermark decoder provides context information to the metadata database, which in turn, provides context specific metadata or initiates context specific actions. For instance, if the object is being edited with an editing tool, the decoder provides information about the editing tool to the database in addition to the link extracted from the watermark. Similarly, the decoder may provide context information indicating where the object resides relative to the user's computer. Using the context information as a key, the metadata database returns metadata or initiates processing actions that are associated with the context.

Another way to implement the context sensitive behavior is to allow the decoder to control the presentation of watermark-linked actions or information based on the context of the media object. In the case where the context is defined by the application, this approach is akin to giving the application access to all of the linked metadata or actions, and then letting the application control presentation of the linked actions or information to the user. In such a scenario, the metadata database returns at least a descriptor of linked information and actions, and the application chooses which sub-set of the information or actions to apply based on the context. In the case where the context is defined by the location of the object, the decoder operates in a similar fashion. For example, it may choose a sub-set of the linked actions of information based on the location of the object.

A specific example of context information is user information supplied by the user's computer to a web server over the Internet using "cookie" technology. First, the user's computer decodes a watermark from a media object, such as an image, audio, or video signal. It then sends information extracted from the watermark along with a cookie including user information to a metadata server or router (generally referred to as a server). The server operates on user information from a cookie along with information extracted from a watermark in a media object to look up information or actions that are personalized to the user. The metadata server, for example, parses the cookie and uses it to reference information or addresses to network resources (URLs of web pages) in a database that relate to information in the cookie. The server further narrows the pertinent information or links by using the watermark information to look up a subset of information or links that are pertinent to the watermarked object. Then either the server, or another network resource referenced by the database operations returns associated information back to the users computer for rendering on the display or audio output device. This approach can be used to limit the information returned to specific news, advertising, content, etc. that is likely to be of interest to the user. A similar effect can be achieved by programming the user's computer to supply user preferences that are used in a similar manner as the cookie information.

Supporting Multiple Watermark Types

As watermark technology proliferates, media objects may have different types of watermarks, each associated with a set of watermark encoders and decoders. To accommodate different watermark types, the decoder can be designed to support different watermark protocols. The watermark protocols provide keys and other parameters specifying how to decode a watermark of a given type. Alternatively, a common Application Programming Interface (API) can be specified for different core watermark encoder and decoder software modules or devices. These schemes facilitate the development of many different types of applications and devices that invoke watermark encoder and decoder functions, yet are independent of the watermark protocol and/or core watermark methods.

To support different core watermark methods, the user may install two or more different core watermark encoder/decoder modules. For example, the core modules may be implemented as plug-ins or dynamic link libraries. When installing a module, the installation process updates a registry, such as the registry in the Windows Operating System, to reflect that a watermark type is supported. In this manner, watermark decoders for different media types, and different types of decoders for a single media type may be supported.

In cases where a media object contains a watermark of unknown type, the media object file may specify the watermark type, e.g., through a parameter in a file header. The file browser, or other client of the core watermark module, may invoke the appropriate decoder by extracting the type parameter from the media object and passing it and a reference to the media object to the core module via the API. The API routes the request to the appropriate core module, which in turn, extracts the watermark message, and returns it to the API. The API passes the message to the requesting application.

In the event that a type parameter is not available, the application or device processing the object may enumerate through all supported watermarking protocols to check if any protocol is present. The watermark protocols for given media or file type may be registered in the device or application (e.g., in a registry of the operating system). To check for each one, the application invokes a watermark screening process for these protocols to determine whether a watermark associated with the protocols is present.

Media Object Branding

The watermark can be used to establish "branding" in addition to facilitating electronic access to other services. In such a branding application, a watermark decoder enabled application or device in a client reads the embedded watermark message from the object and use it to access a digital logo, such as a thumbnail image (e.g., a brand "brand image"). The decoder-enabled application sends an object identifier taken from the watermark message to a server (such as a metadata server on the Internet), which, in response, returns the logo. The application then renders the logo, preferably superimposed on a rendered version of the media object or a graphical representation of it in the user interface of a client computer or device.

In some scenarios, the server also returns an address (e.g., URL) pointing to either a generic "usage rights" server or a custom "usage rights" maintained by the media owner. In an Internet context, the server may return one or more links to related Web sites. Connection rights and corporate branding services may be provided via a central server on the Internet.

Using the object identifier to link to actions and metadata, watermark enabled applications have many options to extend the branding and usage rights services. An application could display "updatable" usage rights associated with the object identifier. In visual media objects, the application may display the branding logo visually superimposed over a portion of the rendered object (e.g., in a corner of a video frame, periodically for a predetermined period of time) or displayed as a splash screen initiation before playback of the media object begins. To make the branding information less obtrusive, it may be accessible upon request through a menu (e.g., when the user clicks on a representation of the object or "help" menu).

The branding service transforms the notion of copyright notification into a substantial ever-present branding opportunity with additional functionality, such as a hot link to the home page of the content owner or to a licensing server. The branding service may be combined with other watermark enabled functionality, such as a copy management instruction in the watermark payload, e.g., a control parameter indicating whether the object may be played, copied (number of copies allowed), recorded, transferred into other device or system, etc. In addition to providing this instruction to control usage, the watermark payload provides additional value to the consumer (e.g., linking to additional information and services associated with a media object) and ensures that the media object is well labeled and branded during playback.

More elaborate hot branding links, usage rights services, and context-sensitive linking may be added by associating the watermark link with software programs, metadata, and pointers to programs and metadata that support these features. These features may be added in the metadata server by adding them to the list of actions and/or metadata to be executed or returned in response to receiving the media object identifier.

In addition, the decoder enabled application may be programmed to send the media object identifier to two or more servers that provide different sets of services or metadata for the object identifier.

Aggregating Metadata

In some applications, a media object may be associated with metadata from two or more different sources. The metadata may be stored in a file that stores the media object. For instance, file formats like JPEG2000, TIFF, JPEG, PSD may allow metadata to be stored along with the media signal (e.g., an image). Metadata and instructions associated with a media object may be stored in the same device as the media object, or in a remote device (e.g., a remote database). In these types of applications, decoders may be programmed to extract metadata from each of the different sources. The media type of file type may signal to the decoder to extract metadata from these different sources. Alternatively, the watermark message or file metadata may enumerate the different sources of the metadata.

In these applications, the decoder may be designed to get metadata from one or more sources and then present an aggregate of all information. The decoder may perform an aggregation function automatically or prompt the user to select desired sources of metadata for display.

Additional Functionality

A number of features can be implemented that take advantage of the watermark message payload and watermark links to other data and actions. Several examples are highlighted below:

Metadata

Metadata can be expressed in many forms and provide additional functionality. In general, metadata is information about the media object. It may also include machine instructions to be executed, or a reference to information or instructions (object, user, program, or machine identifiers, URLs, pointers, addresses, indices or keys to a database, etc.). The machine instructions may, for example, control rendering, decoding, decrypting or other processing of the object. Alternatively, the instructions may provide some ancillary functionality.

One important application of metadata is to provide ownership information. Another is to provide licensing terms and usage rights.

The metadata can be used to describe attributes of the media object that the user or other applications may use. For example, one attribute may designate the content as restricted, which prevents an application from rendering the content for unauthorized users. Another attribute may designate the object as commercial, which requires an application to seek payment or a license before the object is rendered.

Multiple Watermarks

The media object may contain two or more watermarks or watermark messages, each associated with a distinct set of information or actions. For example, the media object may contain a creator ID, a distributor ID, etc. that link to information about the creator and distributor, respectively.

There are a number of ways to add watermarks to a media object, either at object creation time, or later as the object is transferred, copied, or edited. One way is to interleave separate watermarks in different portions of the media object. This can be accomplished by modifying independent attributes of the media object. Independent, in this context, means that each watermark does not interfere with the detection of the other watermarks. While two independent watermarks may alter the same discrete sample of a media object, they do so in a manner that does not cause an invalid read of any of the watermarks.

Independent watermarks may be located in different spatial or temporal locations of the host media signal (e.g., image, video, audio, graphical model, etc.). The may also be located at different frequency bands or coefficients. Also, they may be made independent by modulating independent features of the signal, such as phase, energy, power, etc. of different portions of the signal.

To illustrate the concept, consider an example of a still image object. Each independent watermark may be defined through a different protocol, which is used to encode a different watermark message (e.g., different watermark links for a creator, distributor, user, etc. of the media object). Independent spatial watermarks may be interleaved by mapping each of the watermarks to a unique set of spatial locations in the image.

In a similar fashion independent watermarks may be encoded in a temporal data sequence, like audio or video, by mapping each watermark to unique temporal locations.

Digital Rights Management

The watermark may be linked to information and processing actions that control use of the media object. For example, the metadata may indicate the owner of the intellectual property rights in the object as well as licensing terms and conditions. Further, the watermark link or metadata trigger processing actions that control use of the object, such as requiring the user to submit payment, and exchanging decoding keys (e.g., decryption, decompression, etc.). While some amount of decoding of the object may be required to extract the watermark, the remainder of the content may remain encoded and/or encrypted until the user obtains appropriate usage rights.

The digital rights management functionality can be implemented in a licensing or usage rights server, such as the metadata server. This server determines the owner and licensing terms based on the watermark message and executes actions required to authorize use of the object, e.g., electronically receiving payment information from the user, establishing and recording a user's assent to the license, forwarding transaction details to the owner, and returning a usage key to the user. As the user plays or renders the media object, the watermark decoder can send a message to the server to log information about the usage, such as instances of use, machine ID of the player, time of use, etc.

Watermark and Context Information for Usage Control

Watermark decoders can also use context information along with information extracted from a watermark embedded in a media object to control use of that object. For example, the watermark decoder may be programmed to control the rendering, editing, copying or transfer of a media object depending on control data in the watermark and context information derived from the device or system in which the object resides. For example, the watermark may instruct the decoder to inhibit rendering of a media object if its outside of a given file (e.g., a specified web page, computer system, computer network, etc. ). After decoding the watermark including such control data, the decoder determines the pertinent context information that must be present to enable a particular operation. This may encompass such actions as verifying the presence of a user identifier, computer identifier, file identifier, storage media identifier, computer identifier, network identifier, etc. before enabling the operation. These identifiers are stored in association with the entities that they identify, or are dynamically derived from these entities. For example, a file identifier can be stored in a file header or footer, or derived from content in the file. A storage device identifier can be stored on the storage device, or derived from content on the storage device or some attribute of it.

This context sensitive control of media objects is particularly useful in controlling the use of media files like music and movies, but applies to other types of media signals in which watermarks can be encoded. For instance, such context sensitive control can be used to prohibit rendering, copying or transfer of a media object when it is removed from the context of a web page, a computer, a storage device (e.g., a CD or DVD), file sharing network, computers of paid subscribers of a subscription service, a collection of related media objects, etc.

Asset Management

The watermark embedded in a media object may play a role in asset management. Every time the object is processed (opened, edited, copied, etc.) an application equipped with a decoder can log information about the processing event. Alternatively, it can send a transaction event to a monitoring server via the Internet. The transaction event may specify information about the object, such as its ID, the user's ID, the time and location of use, the nature of the use (number of playbacks). The monitoring server or application records this transaction event in a database and, upon request, generates reports about the use of a given object, or by a given entity. Any of the fields of the transaction record can be used to query the database and generate custom reports.

Integration with Directory Services

Directory services like the Lightweight Directory Access Protocol (LDAP) can use the watermark or operate in conjunction with the watermark decoder to provide additional functionality. LDAP is an on-the-wire protocol used to perform directory operations such as read, search, add, and remove.

For example, an LDAP service can be used to determine when to extract the watermark link and update attributes of a media object. For example, the LDAP service may control periodic updates of the media object's attributes by invoking a watermark decoder and retrieving an update of its attributes from a metadata server at predetermined times. An LDAP search filter that includes or accesses a watermark decoder can also be provided to find watermarked media signals in files stored in file directories on computers.

Media Object Player and Delivery Integration

A watermark decoder may be integrated with software and devices for playing or editing media objects. There are a variety of commercially available players from Liquid Audio, Microsoft, and RealNetworks, to name a few. Such integration allows metadata and actions linked to the media object to be accessible to the user in a seamless fashion through the user interface of the player. For example, when a user is playing a video or audio file, a watermark enabled player may access and display linked metadata or actions automatically or at the user's selection. In either case, the user need not be aware that metadata or actions are obtained from a remote server via an object identifier. Also, such integration enables a content owner to link an object to licensing or assert usage control information or actions at playback time, whenever and wherever the object is played. Such information and actions can be implemented by placing data or instructions in a watermark within the object, or putting an object identifier in the watermark that links to metadata or actions outside the object as detailed throughout this document.

In many cases, it is desirable to access the functionality provided via the watermark transparently to the user. As such, the media player can be enhanced to display items linked via the watermark in a manner that appears to be a natural extension of the user interface. When the user or other program invokes the media player to play an object, it displays metadata or actions provided within or linked via the watermark in an extension of the media player's user interface.

These metadata or actions may be retrieved when the media player is launched or at some other time (e.g., as a background task, in response to user request, when the object is loaded to the computer or device where the media player resides, etc.). In one scenario, the media player invokes a watermark decoder on an object in response to a user's request to play the object. In this scenario, the media player passes the address of the object to the watermark decoder, which in turn, attempts to decode a watermark embedded in it. Upon locating a watermark, the decoder forwards an object identifier extracted from it to a metadata server, which returns metadata or actions associated with the object identifier. During metadata retrieval, the media player proceeds to play the media object. When the linked metadata arrives, the extension to the media player displays returned metadata or actions.

Figure 5:
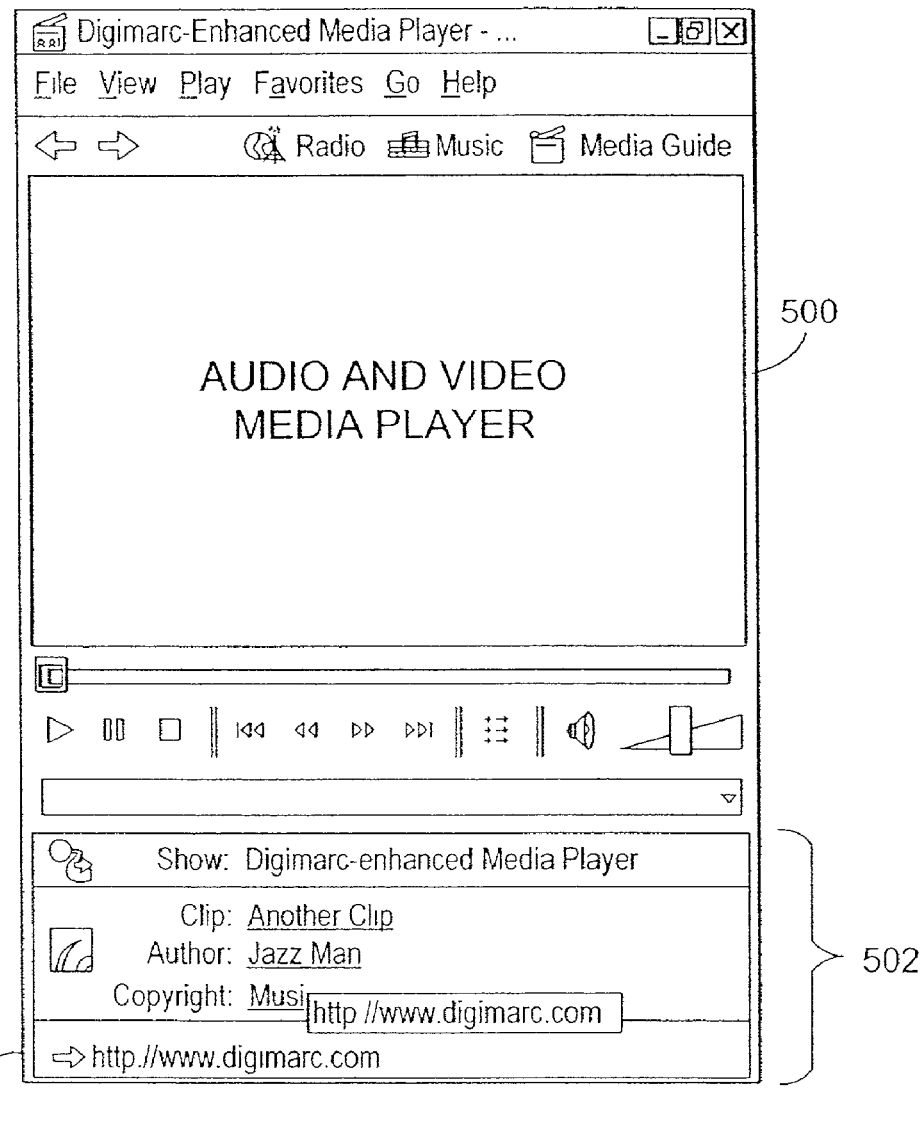
FIG. 5 is an example of user interface features enabled by integrating a watermark decoder in a media player.

FIG. 5 illustrates an example of an enhanced version of Microsoft's Windows Media player showing metadata and actions. In this example, the user interface window of the player is expanded in a bottom section 502 to show metadata and links associated with a media object. When the user positions the cursor over the items, "Clip," "Author," or "Copyright, the bottom tab 504 displays a URL associated with that item. By clicking on one of the items, the player invokes an Internet Browser, which sends a query to the resource at the selected URL (e.g., request an HTTP request to download an HTML document).

The watermark decoder may be invoked by another application, which launches the media player. Consider a case where a user is browsing audio or video files, either with a file browser or Internet browser. After finding a desired media object for playback, the user selects the object for playback. For example, the user could select a "Play" option via a context menu of the Windows Explorer, or via an insert in an HTML document as explained above. In the first case, a shell extension invokes the watermark decoder to get the associated metadata and executes a program (e.g., COM object, script, etc.) that runs the media player and displays the additional metadata linked via a watermark. In the second case, a Java script or other insert in the HTML document invokes the decoder and starts a program that runs the media player in a similar fashion.

One way to implement a program to control the Windows Media player is through the use of an Advanced Streaming Redirector (ASX) file. The file contains a script that launches the player and displays the metadata (e.g., URL links and information about the object) linked via the watermark. For information about ASX files and the use of these files to control Windows Media Player, see Microsoft's Developer's Network.

Content Authoring Tools

Media content authoring tools, including web page design tools, may include watermark embedding functionality to embed watermarks into content, such as web page content. This embedded data then signals watermark decoder enabled devices and software to perform functions associated with the embedded watermark data.

Such tools may also include watermark decoding functionality to enable content developers to use the watermark decoding feature to screen media object for watermarks within the content authoring environment. If the watermark within a media object being edited conveys information (e.g., copyright owner information, licensing terms, etc.), then the authoring tool can convey this information to the user. If the watermark includes usage control information, then the authoring tool can control the use of the media object based on that information. For example, the watermark in a media object may convey an instruction that inhibits the authoring tool from editing the media object, unless the user obtains authorization from a licensing server.

Web Server Integration and Related Applications

Watermark encoding and decoding functions may also be integrated into network server application software to support functionality described in this document as well additional functionality. In particular, watermark encoding and decoding can be integrated into web servers.

Watermark encoders can be integrated into web servers to embed watermarks in media content transferred to, from or through the server. One reason for embedding watermarks at the server is to encode transaction specific information into a media object at the time of its transfer to, from or through the server. The transaction specific information relates to an electronic transaction between the server and some other computer. For example, before downloading or uploading a media object file, the server may embed information about the recipient/sender of the file into the media signal in the file (e.g., image, audio or video file). Since the watermark remains in the signal, information about the sender/recipient in the watermark remains with the media signal in the file through digital to analog-analog to digital conversion, file format changes, etc.

The server may embed a link to information or actions (links to related web sites) in the file that is uniquely tailored to the sender's/recipient's preferences. The preferences may be obtained from the user's computer, such as through popular "cookie" technology commonly used in Internet browsers, or may reside in some other database that associates a user (a user identifier or an identifier of the user's computer) with the user's preferences (e.g., types of content preferences like news, financial information, sports, e-commerce opportunities, etc.). In this case, the server obtains the user identifier and then queries the database for the associated preferences.

The server may also use the preferences obtained in this manner to control what forms of advertising is returned or linked with the file. For example, the user may request the server to download a desired audio, video, or image file. In response, the server gets the user's preferences and downloads the requested file along with advertising information and web site links that match the user's preferences. The advertising information and links can be referenced by embedding a watermark that includes an address of the information, or that includes an index to a database entry that stores the information and/or links to other information, web sites, etc. The user's computer receiving the file downloaded from the server then renders the file and other related advertising information (e.g., provided in HTML, XML or some other conventional data format) from the server or some other server linked to the file via a watermark in the file.

The server may also embed usage control information into a watermark in a media file based on usage control rights requested by and paid for by the user in an electronic transaction between the server and the user's computer. These usage control rights can then be decoded by other applications and used to control rendering of the file, copying, recording, transfer, etc.

Network servers may also include watermark decoding functionality, such as software for decoding watermarks from media signals in files that are transferred to, from, or through the server. This enables the server to perform the many watermark-enabled functions described or incorporated into this document as well as to provide enhanced functionality. For example, the watermark may include usage control data that the server extracts and acts upon. Examples of usage control data include content rating information (adult content indicators), copy or transfer control information, rendering control information, compression/decompression control information, encryption/decryption control information, links to external information or actions, etc.

After extracting this data from the watermark, the server can modify the file based on the extracted data. For example, the server may compress or encrypt the file in a manner specified in the watermark before transferring the file. The user at the computer receiving the file would then need to have a compatible decompression or decryption program or device to render the media object in the file.

In addition to, or as an alternative to modifying the file based on the extracted watermark data, the server can send related information or instructions to the receiving computer that controls of facilitates usage of the file. For example, if the server determined from the watermark that the content was marked as "adult content", then it could send additional information with the file (e.g., HTTP header information along with a web page including watermarked content) to instruct rendering software, such as the browser, how to render the watermarked content. The rendering software on the receiving computer can then decide how to render the content. For example, if a child is logged onto the computer receiving the file, then the rendering software can opt not to render content in the file marked as "adult content." As another example, the server may decode a watermark that instructs it to send decryption or decompression keys to the rendering software to enable the receiving computer to decrypt or decompress the content. Public key encryption schemes can be used to perform key exchanges between the sending and receiving computers. As another example, the server may decode a watermark that instructs it to send additional data along with the watermarked file including links to web sites based on information that the server decoded from the watermark.

Content Filtering and Counting

Watermark decoders can be used in computers and computer networks to filter watermarked media objects and to count instances of watermarked media objects. Filtering refers to the use of the watermark decoder to decode watermarks from objects that reside in a particular location and control their use, transfer or rendering in response to control data in the watermark, and optionally, in response to additional context data outside the watermark. These media objects may be temporarily stored at the location of the filter, as in case of a device or computer responsible for transferring the media object. Examples of such systems are e-mail servers, firewalls, routers, or gateways in computer networks that use watermark decoding to control the transfer of certain media objects to other devices or computers based at least in part on watermarks found in the objects. The media objects may also be stored at the location of a filter on a more permanent basis. For example, the filter may be used to screen media objects that a user downloads to or uploads from a mass storage device such as a hard drive or remote personal library of music, image and movie files on a mass storage device accessible via the Internet. The filter may be used to inhibit downloading or uploading from the mass storage device in response to a watermark in a file being transferred, or alternatively, may be used to control rendering of the file.

Object counting refers to a way of logging the number of times a watermark media object is encountered, either by filtering media objects that pass through a particular device or system like a firewall or e-mail gateway, or by actively searching a network of systems like the Internet and screening for watermarked media objects found and downloaded as a result of the search. The logs maintained by watermark decoding systems can be adapted to include additional information about the object, including information from the watermark, such as an owner, user or transaction identifier, tracer data, and information about the object, such as where it was found, how it was being used, who was using it, etc. Tracer data includes data that is embedded in the file in response to some event, such as detecting unauthorized use, copying or transfer of the file.

The watermark decoder may be further augmented to send the log electronically to another device or computer in response to a specific request or in response to events. For example, the decoder can be programmed to send a report to a central database on another computer when the number of watermarked objects encountered has exceeded a threshold, and/or when certain information is found in a watermark, such as a particular identifier or tracer data that was embedded in the media object in response to detecting an unauthorized use or copying of it. Programmatic rules can be established within the decoder to specify the conditions under which watermarked media objects are filtered and counted, to specify which information is logged, and to specify when the logged information is transmitted to another computer.

The watermark based filtering and counting functions can be implemented in a variety of software applications and devices. Some examples include a network firewall, and other client, server, or peer-to-peer software applications that encounter media objects (such as operating systems, media players, e-mail readers and servers, Internet browsers, file sharing software, file manager software, etc.). One particular use of watermark based filtering, screening and counting is to monitor watermarked content sent in or as an attachment to e-mails sent between computers.

Watermark Based Spiders

Prior patent documents by the assignee of this patent application describe systems and methods of automated searching and watermark screening of media object files on computer networks like the Internet. See U.S. Pat. No. 5,862,260, which is hereby incorporated by reference. The software used to perform automated searching and compiling of Internet content or links is sometimes referred to as a web crawler or spider.

As extension of the watermark based information retrieval described in U.S. Pat. No. 5,862,260 and marketed by Digimarc Corporation, watermark decoders can be employed in a distributed fashion to perform watermark screening and counting of watermarked media objects on networks, including the Internet. In particular, watermark decoders can be deployed at a variety of locations on a computer network such as the Internet, including in Internet search engines that screen media objects gathered by each search engine, network firewalls that screen media objects that are encountered at the firewall, in local area networks and databases where spiders do not typically reach, in content filters, etc. Each of these distributed decoders acts as a spider thread that logs watermark information as described in this document and those incorporated by reference. Examples of the types of information include identifiers decoded from watermarks in watermarked media objects, media object counts, addresses of the location of the media objects (where they were found), and other context information (e.g., how the object was being used, who was using it, etc.). The spider threads, in turn, send their logs or reports to a central spider program that compiles them and aggregates the information into fields of a searchable database.

Event Scheduling Based on Embedded Data

Watermark decoding may be used in conjunction with an event scheduler to schedule programmatic events that occur in response to decoding a watermark message of a given type. Throughout this document, there are many instances of triggering actions in response to decoding information, instructions, or links from a watermark message. In some cases, these actions are programmatic actions made by software in response to the watermark, while in other cases, these actions are device actions made by hardware circuitry, such as in the case of usage control of media signals in hardware implementations of audio and video players, recorders, etc.

Rather than taking an action immediately upon decoding a watermark message, an event scheduler can be used to schedule programmatic or device actions to occur at a later event, either at a specified time according to a clock or timer, or in response to a subsequent input, action, etc.

One example of this is to schedule a link to a web site to be activated at later, and perhaps periodic events. For example, a watermark decoder implemented in a browser, operating system, media player or other software application decodes a watermark from a media object that links the object to one or more web sites. In response to decoding the watermark, the decoder schedules programmatic actions to occur at later times. Some examples of these actions include: displaying a window with a link to a specified web site at periodic intervals or in response to a programmatic action like the launching of a browser, media player or other application. This approach can be used to prompt the user to buy a product, such as the media object (a music or video track) or some product depicted in the media object. Using this approach, many actions can be scheduled to occur in response to a single decoding of the watermark.

Integrating a Watermark Encoder in Operating Systems and Other Applications

In some applications, it will be useful to encode a watermark or overlay one or more additional watermarks to perform any of the functions mentioned above (e.g., to track uses, refresh usage rights, add links to additional information and actions, etc.). Watermark encoding functionality could be added to an operating system, Internet browser, or other applications. For instance, through a drag and drop procedure, a user could embed a watermark in a media object as a means of enabling the various functions outlined above.

As another example, a watermark encoder may be integrated in a file browser, Internet browser, media player, or other application using the same integration techniques outlined above for the decoder. FIG. 1, for example, shows watermark encoder functionality integrated into the Windows Explorer file browser via a shell extension. In particular, the watermark encoder is implemented as a shell extension handler. This handler is registered as a context menu extension in the registry of the Windows Operating system. As an alternative, it could be implemented as a properties page extension handler.

Figure 6:
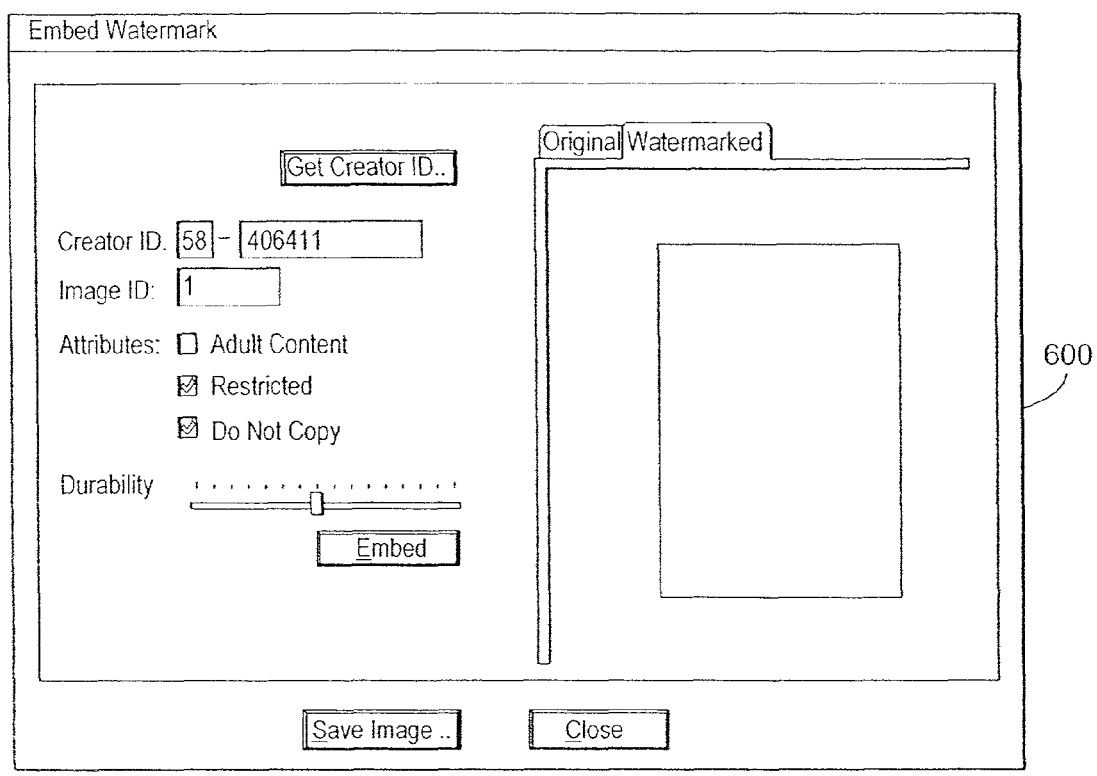
FIG. 6 is an example of a user interface features enabled by integrating a watermark encoder in an operating system or other application program.

To access the watermark encoder in the FIG. 1 example, the user right clicks on a media object, and selects the context menu option called "Embed Information." In response, the handler displays the window 600 shown in FIG. 6. This window enables the user to enter various Ids (e.g., a creator ID, image ID), which are encoded into an image via a watermark. The user may also set or select attributes of the image object. Finally, the user can control the embedding process by adjusting the durability of the watermark through a scroll bar control. The user can compare the original and watermarked versions of the object by selecting the "Original" and "Watermarked" tabs. When satisfied, the user can save the watermarked image and exit the window (e.g., by selecting close). Metadata and actions may be associated with the image object by forwarding them to the metadata server, which associates them with an object ID.

While the example in FIG. 6 depicts a still image object, a similar approach may be used to embed watermarks in other media objects, such as video and audio objects. To compare marked and unmarked audio or video objects, the shell extension may be designed to launch a media player to play the marked and unmarked objects as desired.

Operating Environment for Computer Implementations

Figure 7:
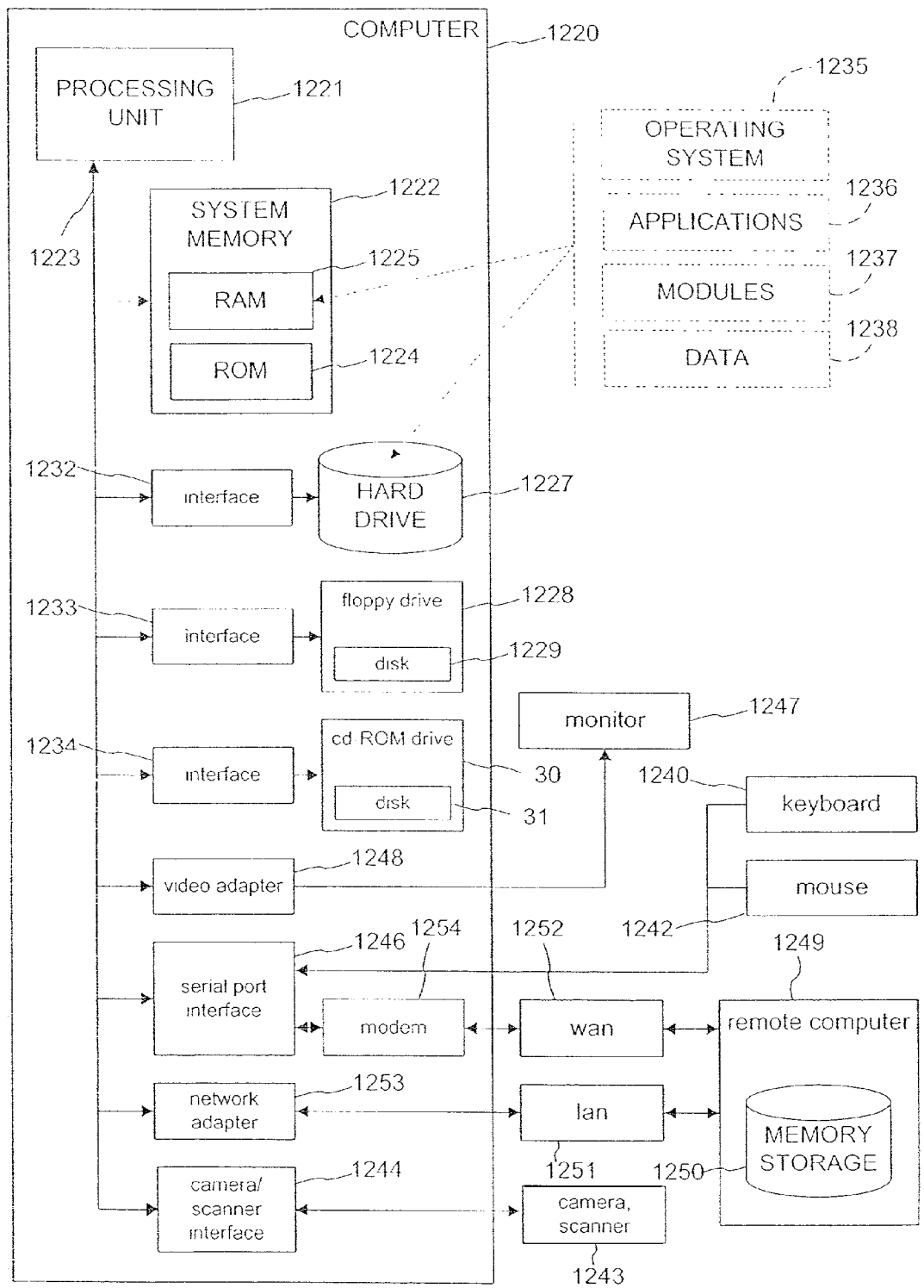
FIG. 7 is a diagram of a computer system that serves as an operating environment for software implementations of watermark encoder/decoder enabled applications.
Figure 7:
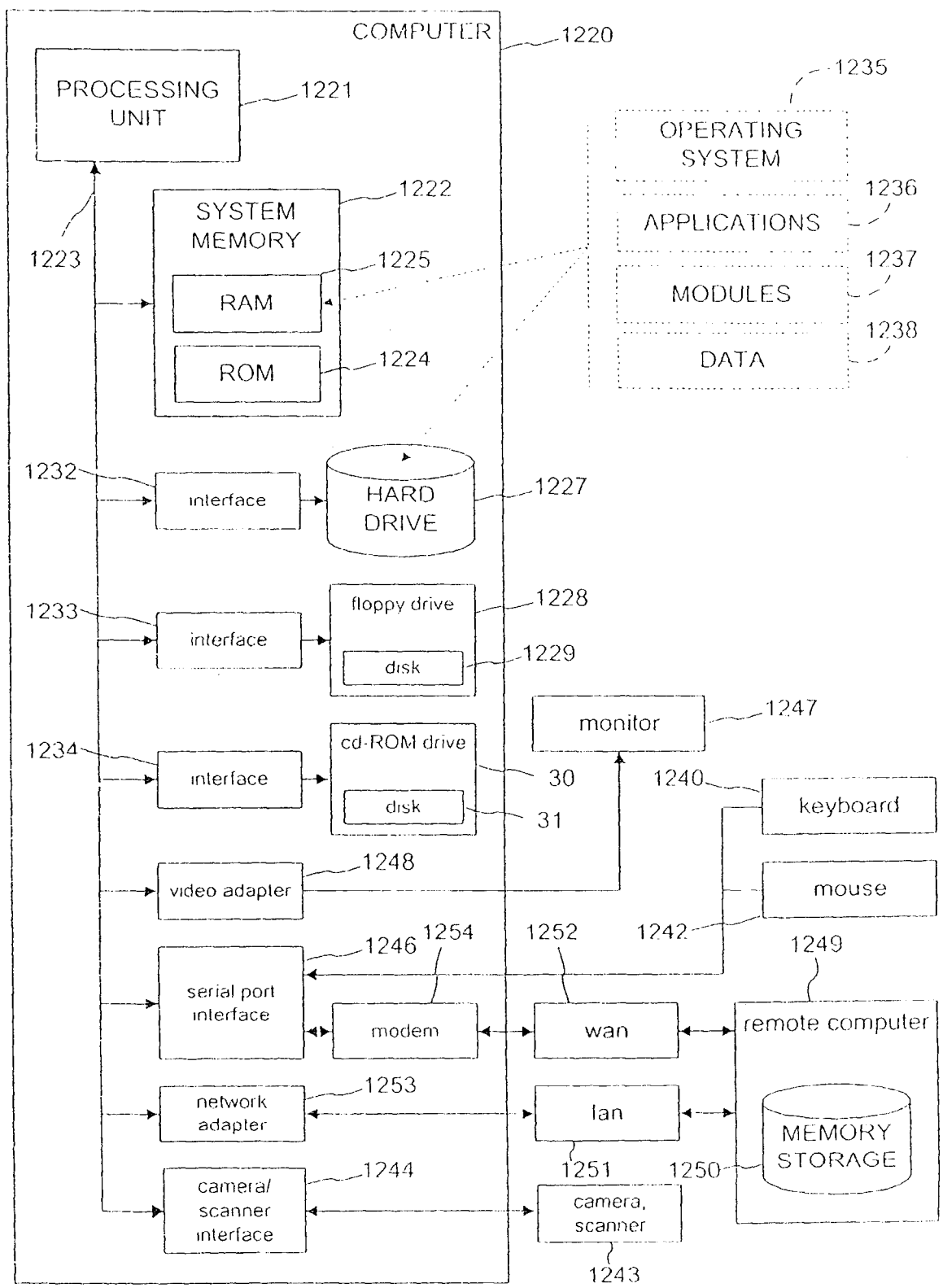

FIG. 7 illustrates an example of a computer system that serves as an operating environment for software implementations of the watermarking systems described above. The embedder and detector implementations are implemented in C/C++ and are portable to many different computer systems. FIG. 7 generally depicts one such system.

The computer system shown in FIG. 7 includes a computer 1220, including a processing unit 1221, a system memory 1222, and a system bus 1223 that interconnects various system components including the system memory to the processing unit 1221.

The system bus may comprise any of several types of bus structures including a memory bus or memory controller, a peripheral bus, and a local bus using a bus architecture such as PCI, VESA, Microchannel (MCA), ISA and EISA, to name a few.

The system memory includes read only memory (ROM) 1224 and random access memory (RAM) 1225. A basic input/output system 1226 (BIOS), containing the basic routines that help to transfer information between elements within the computer 1220, such as during start-up, is stored in ROM 1224.

The computer 1220 further includes a hard disk drive 1227, a magnetic disk drive 1228, e.g., to read from or write to a removable disk 1229, and an optical disk drive 1230, e.g., for reading a CD-ROM or DVD disk 1231 or to read from or write to other optical media. The hard disk drive 1227, magnetic disk drive 1228, and optical disk drive 1230 are connected to the system bus 1223 by a hard disk drive interface 1232, a magnetic disk drive interface 1233, and an optical drive interface 1234, respectively. The drives and their associated computer-readable media provide nonvolatile storage of data, data structures, computer-executable instructions (program code such as dynamic link libraries, and executable files), etc. for the computer 1220.

Although the description of computer-readable media above refers to a hard disk, a removable magnetic disk and an optical disk, it can also include other types of media that are readable by a computer, such as magnetic cassettes, flash memory cards, digital video disks, and the like.

A number of program modules may be stored in the drives and RAM 1225, including an operating system 1235, one or more application programs 1236, other program modules 1237, and program data 1238.

A user may enter commands and information into the personal computer 1220 through a keyboard 1240 and pointing device, such as a mouse 1242. Other input devices may include a microphone, sound card, radio or television tuner, joystick, game pad, satellite dish, digital camera, scanner, or the like. A digital camera or scanner 43 may be used to capture the target image for the detection process described above. The camera and scanner are each connected to the computer via a standard interface 44. Currently, there are digital cameras designed to interface with a Universal Ser. Bus (USB), Peripheral Component Interconnect (PCI), and parallel port interface. Two emerging standard peripheral interfaces for cameras include USB2 and 1394 (also known as firewire and iLink).

In addition to a camera or scanner, watermarked images or video may be provided from other sources, such as a packaged media devices (e.g., CD, DVD, flash memory, etc), streaming media from a network connection, television tuner, etc. Similarly, watermarked audio may be provided from packaged devices, streaming media, radio tuner, sound cards, etc.

These and other input devices are often connected to the processing unit 1221 through a port interface 1246 that is coupled to the system bus, either directly or indirectly. Examples of such interfaces include a serial port, parallel port, game port or universal serial bus (USB).

A monitor 1247 or other type of display device is also connected to the system bus 1223 via an interface, such as a video adapter 1248. In addition to the monitor, personal computers typically include other peripheral output devices (not shown), such as speakers and printers.

The computer 1220 operates in a networked environment using logical connections to one or more remote computers, such as a remote computer 1249. The remote computer 1249 may be a server, a router, a peer device or other common network node, and typically includes many or all of the elements described relative to the computer 1220, although only a memory storage device 1250 has been illustrated in FIG. 7. The logical connections depicted in FIG. 7 include a local area network (LAN) 1251 and a wide area network (WAN) 1252. Such networking environments are commonplace in offices, enterprise-wide computer networks, intranets and the Internet.

When used in a LAN networking environment, the computer 1220 is connected to the local network 1251 through a network interface or adapter 1253. When used in a WAN networking environment, the personal computer 1220 typically includes a modem 1254 or other means for establishing communications over the wide area network 1252, such as the Internet. The modem 1254, which may be internal or external, is connected to the system bus 1223 via the serial port interface 1246.

In a networked environment, program modules depicted relative to the personal computer 1220, or portions of them, may be stored in the remote memory storage device. The processes detailed above can be implemented in a distributed fashion, and as parallel processes. It will be appreciated that the network connections shown are exemplary and that other means of establishing a communications link between the computers may be used.

Extensions to Other Forms of Media Object Linking

The approaches described above can be implemented for a variety of media object files, including image, graphics, video and audio files, or files containing two more different media types. Also, media objects may be linked to their metadata via data structures other than a watermark embedded in the object. For example, the object identifier need not be inserted in a watermark, but instead may be placed somewhere else in the media object file, such as a file header. Such an identifier may be inserted into the header of coded or compressed files. To extract the identifier, a decoder parses the header and extracts the object identifier. Then, the decoder forwards the identifier to a metadata server, either directly, or by launching another application, such as web browser, to issue the metadata request and output the data and/or interpret code returned from the metadata server.

Context Sensitive Connected Content

Connected content refers to a method of connecting multimedia content, such as an image, video stream or audio clip, to a network resource, such as a web page or other program. As described throughout this document, one way to form connected content is to include a unique identifier (ID) in the content, and link the content to related data, possibly using a web page URL, via a central Internet web router and server based upon the unique ID and secondary database. The ID can be the part or all of the message payload of a digital watermark embedded in the content signal so it is inherently distributed with the content, or as a meta tag, possible contained in the header or footer of the file and potentially locked to the file via encryption.

When the user wants to display the related data, possibly by clicking on an icon that displays that the content is connected, the user may be using one of many types of devices. Devices can have the following displays a computer monitor, a TV screen, or a small screen on a portable Internet appliance or a cell phone. Each device can have a low- or high-speed (bps) connection to the Internet. Each display has its unique characteristics, such as a computer screen can display fine grain detail and text whereas a TV cannot. An Internet appliance and cell phone have small displays. Each may have a high or low speed connection. Thus, by sending the context of situation, such as the display features and/or Internet connection speed, to the central web server, the correct type of content can be returned to the display device.

Specifically, the web page may have tags that determine the type of devices that each segment of the web page should be sent. The segments could be defined with XML tags of the format <begin tag> segment data </end tag>. More specifically, a web page could look like <small display><pc monitor><TV monitor size=+4> html segment data </small display></TV monitor> html segment data <high speed> html image data </pc monitor> </high speed>. Thus, with a computer monitor on a high-speed connection, all of the content will be sent. In contrast, with a cell phone only some of the text is sent. Or, with a TV screen some of the text is sent and it is reformatted to a larger font.

Alternatively, the web page may contain several complete but different versions, divided by display type and connection speed.

Importantly, the display type and connection speed must be communicated via the web router to the web page server, so the correct context sensitive data can be returned. These features can also be sent using XML structure, such as <speed> high speed </speed> <display> PC Monitor </display>.

Enhanced Digital Asset Management

FIG. 8 illustrates a system for enhancing digital asset management by linking media content with metadata and actions associated with the content. The media content is maintained as a collection of media files (e.g., still image, audio, or video), stored or distributed on one or more devices, such as a web site 800, a content database 802, etc. User's of the content files are typically distributed in many locations, but are interconnected via a local area or wide area network 804. Each user accesses content through a network device such as a Personal Computer, set top box, network enabled audio or video player, personal digital assistant, smart phone, etc. The user's computer 806 shown in FIG. 8 is representative of the wide array of these types of devices.

The user's computer executes a watermark reader application 808 that decodes watermarks from content files 810, such as images, audio or video files. It includes network communication software for establishing a network communication with other systems on a network via TCP/IP. The reader application 808 communicates watermark information extracted from watermarked content to a router application 812 executing on a router system 814. The router application maps the watermark information to a corresponding metadata database management system 816 using a registry 818, which includes data records that include the watermark information and associated metadata database information. The router also includes communication software for receiving requests from reader applications and re-directing requests to the metadata database system 816.

The metadata database system 816 manages requests for information from router applications and reader applications. It includes a metadata database that stores information about the content files. In some implementations, the content database and metadata database may be integrated.

There are a variety of application scenarios for using embedded watermark data in digital asset management. In one application scenario, the reader application operates in conjunction with the router and metadata database to dynamically link content files to information and actions. This scenario operates as follows. The user acquires watermarked content, such as images, audio or video from a computer network (e.g., an extranet, web site or e-mail). The user provides the content file as input to a watermark reader application using the user interface of the reader. In a windowing user interface environment, the user drags and drops the content file from the desktop into the reader UI (e.g., a window).

The reader extracts a watermark message embedded in the content within the file and sends it to a routing application. The routing application is accessible on a network 804 via Internet communication protocols, such as HTTP, XML, and TCP/IP. The routing application maintains a registry database 818 including a number of database records that associate watermark messages with related information. In one implementation, the routing application uses a content identifier extracted from the watermark message to look up a creator identifier. The creator identifier is associated with a metadata database management system. In particular, it is associated with a network address of the database management system to which queries are sent to fetch information and actions linked to the content via the watermark.

The routing application sends a request for related information or actions to the metadata database along with the content identifier and the network address (e.g., IP address) of the reader application. In response, the metadata database sends content/product specific information from the metadata database to the reader for display in predefined fields within reader UI. The metadata database looks up the content/product specific information based on the content identifier.

The metadata may be sent in many different forms. In one implementation, the metadata database sends HTML content back to the reader, which renders it. In another implementation, it sends content in the form of XML. For background on a routing application, see U.S. application Ser. No. 09/571.422 filed May 15. 2000 (Now Pat. No. 6.947.5711).

The information returned to the reader may enumerate links to additional actions, such as hyperlinks to web sites, additional content files, or programs. Some examples of these actions include options to order another version of the watermarked content or products or services depicted in the watermarked content. For example, the user can click an option displayed in the reader UI to go to a URL specified by the metadata database for additional functionality, such as fetching more information from the metadata database or some other database, purchasing related products or services, launching a search for related content, etc.

In one implementation, a search program is implemented as part of the metadata database management system. When the user selects an action to launch a search for related content, the reader application sends the request to the metadata database management system. The metadata database looks up corresponding content descriptors for the watermarked content file based on the content identifier. It then searches for other content files represented in the metadata database that have matching descriptors, and returns pointers to the related content files to the reader application, which displays a listing of them. The user may then click on a listing to fetch and render the selected content file.

In another scenario, the functionality of the reader application described above is incorporated into an Internet browser or file browser, such as Windows Explorer in the Windows Operating System. Using a web of file browser equipped with watermark reader software (e.g., a plug-in, integrated via an Application Programming Interface, or as a shell extension to the operating system), the user browses content files. The user may browse rendered versions of the file, such as a rendering of an image file, a thumb nail of an image, or a file icon representing an audio or video file in a file directory structure. As the user scrolls over rendered content (such as an image displayed on the user's display monitor) or representations of files (e.g., file icons in a directory structure), the application dialogue appears notifying the user that the content file has additional information available. From this point forward, the browser operates in a similar fashion as the reader application described above. The browser renders metadata returned from the metadata database in the form of HTML or XML.

The router system may be implemented within a local area network in which the user's computer resides, or may be located on a wide area network such as the Internet. Similarly, the metadata database may be implemented within a local area network in which the user's computer resides, or may be located on a wide area network such as the Internet.

In some cases, the metadata returned to the user's computer may be formatted for the type of computer. For example, PDA's, cell phones and other consumer electronic devices may have differing display protocols for which the data needs to be formatted for proper rendering. One way to address this is for the reader application to communicate reader device information to the router, which in turn, provides this information to the metadata database. The metadata database may provide data in the proper format, such as a format for display using the Palm Operating system, or may route it through an intermediate data formatting server that converts the data before sending it to the reader application.

For example, in the diagram of FIG. 8, the data formatting server is connected to the network 804 (e.g., the Internet) and a network for wireless personal digital assistants (e.g., the Palm.net network). The wireless PDA extracts a content identifier from a content item (e.g., from a watermark in the content item). The PDA sends the identifier to the data formatting server in a message, which passes the message to the router 814.

The router parses the identifier from the message, looks up the network address associated with the content identifier, and returns it to the data formatting server. Next, the data formatting server retrieves the metadata associated with the content identifier from the metadata database located at the network address. Specifically, the data formatting server retrieves a web page indexed by the network address returned by the router. Next, the data formatting server reformats the metadata for display on the PDA and sends the reformatted data to the PDA for rendering. Specifically if the metadata is a web page, the data formatting server reformats the web page for display on the PDA's monitor. For other types of metadata content, the data formatting server formats the metadata content for delivery to the PDA and rendering on the PDA, such as by converting to a compressed file, or a streaming file format like Microsoft's ASF format. This example is applicable to other portable communication devices like wireless phones.

The above processes performed within the data formatting server may be performed in whole or in part on router system 814, metadata database 816, and the content database 802. For example, the router can perform the function of fetching the web page in response to looking up the web page address in the registry, and then reformatting the web page for rendering on the PDA device, wireless phone, or other client device (e.g., set top box, TV, etc.). In addition, the router can send information about the client device, such as a device ID sent by the reader application 808, to the metadata database, which in turn, formats the metadata in a format for rendering on the PDA device or wireless phone.

In particular, the data formatting functions may be performed in a product handler executing in the router system. The product handler refers to a process described in U.S. application Ser. No. 09/571,422 (Now U.S. Pat. No. 6,947,571), and incorporated by reference into this patent application.

To improve performance, the reader application can be designed to cache watermark data to avoid repeated read operations on the same content. In particular, the reader application retains watermark message data decoded from some number of most recently used files, along with the name of the files. When the user instructs the reader to fetch related information for a selected file, the reader first checks the cache for watermark message data extracted from the file, and if present, forwards that message data to the router application. Further, the reader application may also cache metadata associated with most recently, or most frequently accessed media files. This may require additional memory, but obviates the need to decode the watermark and fetch the metadata.

While FIG. 8 shows a single metadata database, the router system may link a watermark message to two or more different metadata databases. The router system can return HTML or XML, for example, giving the user the option to choose which metadata database he or she would like information from. Alternatively, the router can issue multiple requests to each of the metadata databases listed in the registry for a particular watermark message. Each of the metadata databases then return related information to the reader application in response to the router application's request.

In one implementation, the metadata is returned to the reader application as XML. This format enables the reader to parse the metadata and format it for display within fields of the reader UI.

Some content files may have multiple different watermarks in different blocks of the content. Each of these watermarks may link to the same or different metadata, or metadata database.

Enhanced Content and Metadata Searching and Indexing

The above digital asset management systems and processes may be used advantageously in various combinations with content and metadata searching and indexing systems, such as those described in 60/198,857, Ser. No. 09/571,422 (Now U.S. Pat. No. 6,947,571), Ser. No. 09/620,019 and Ser. No. 09/636,102. The following section describes systems and processes for content searching and indexing that employ imperceptibly embedded watermark data in combination with other mechanisms for identifying and indexing multimedia content, including still images, video, audio, graphics, and text.

Peer-to-peer (known as P2P) file sharing is the current rage in the Internet. Examples of such systems include Napster, AIMster, Scour.net, Gnutella, and FreeNet, to name a few. These file-sharing systems allow users to share files directly between their computers, with a central database or a distributed database that is passed from computer to computer. The file sharing is usually restricted to a certain file type, such as music or videos, and to a certain directory. These systems are based upon metadata tags in the file headers or footers, or filenames, and users are concerned about opening their hard drives. For example, most MP3 files have a standard ID3 tag, v2 in their header or v1 in their footer, which includes the song, album and artist names. Current file-sharing systems only search at the beginning, and possibly when the user connects to the file sharing network. This works when you share one small directory and only search for file names and metadata tags. These systems are also usually based upon a proprietary program reporting about one individual computer. These limitations and the fact that the systems work with a restricted file type go hand in hand because it is unknown how to expand the system and remain user friendly.

Web searching is one of the first booms in the Internet. Examples include AltaVista, Yahoo!, Excite, and Google, to name a few. Web searching allows the user to find information that is distributed on the Internet. However, the searching systems have two major problems. The web crawlers that find information can only search around 10% (a generous estimate). The web crawler also only locates surface information, such as HTML (hypertext markup language) web page, and ignores deep information, including downloadable files and database information. Inventors are trying to solve the latter problem with search engines that query web pages and then search, thus potentially finding deep database or downloadable files. However, this is slower than general searching and can never cover the web.

The unique combination of these two technologies solves the file-sharing restrictions and user-friendly problems and web searching limitations. The combination includes running web crawlers (also known as spiders) locally on numerous remote networks, domains or computers, and having these web crawlers report back to a central or distributed database. This database can be searched, via a user interface similar to the one used for current search engines, where the user enters keywords or phrases, and desired information is returned. As an extension of this user interface, a watermark detector may be used to extract a watermark bearing a content identifier, and possibly content type tags, that are used as input for a search to find related content or information about the content.

Currently, only web pages are returned as links in web-based search engines. However, with this combined system, web page links, proprietary filename links, and database links are returned. Another advantage over current web searching is that rather than the web crawlers running on the web and going from link to link, the crawlers run on the local system with the permission and guidelines of the system they are searching. Another advantage is that, since the web crawlers are running locally in a user-defined (i.e. restricted) environment, they can be designed to look at database entries and non-HTML file formats, such as word documents, MPEG movies, and MP3 audio files. An additional advantage is that web crawlers can be running on numerous, potentially every, local network, or within numerous or potentially every domain since they run locally and do not block Internet access by downloading the web information and then scanning it.

Advantages over file-sharing systems include searching the whole document for keywords. This novel system also searches for related information, such as metadata and watermarks, and searches all document types. In addition, the local programs are designed for crawling the current computer or local network, and not just a specified directory, although user-defined limitations can exist. Another advantage is that the searching is continuous, allowing the search times to be set as to not slow the system during peak hours. Thus, this novel system can handle huge amounts of data without network congestion or slow user response.

Finally, the system can be designed to search documents for out-of-band information, such as header and footer metadata, or in-band information, such as watermarks, so that the files can be classified according to this extra information and not only text. This is extremely useful for non-text media files, such as images, audio and video, since search engines currently do not know how to classify these files. For example, the watermark may contain keyword information (e.g., content type tags) about a scene in an image and whether the image is acceptable for viewing by minors (an adult content flag).

Having summarized the system and its advantages, we now describe an implementation of a system for searching and indexing multimedia content and metadata related to that content. FIG. 8 shows components of this system. In this system, a web searching agent (e.g., search agent thread 820) runs locally on a collection of distributed, registered web servers (e.g., web server 822) and reports back to a searchable database 824 available for general web searching. In particular, the agent invokes watermark detectors to extract content identifiers from watermarks imperceptibly embedded in multimedia content files 826 and fetch related metadata using the metadata linking system described above. Alternatively, the watermarks include content type flags that may be used to index the content type without resorting to a metadata database 816. In addition, the agent invokes text based searching of files and file headers and footers to index text content, such as word processor documents 828, based on key words. The agents (e.g., 820) supply the content type tags from watermarks and key word text to a searchable database (824) that indexes the content type tags and text in a content index 830. The content index has a searchable index of key words and content tags 832 that are associated with file pointers 834 of files that match the description of the key words/content tags. The file pointers provide the location of the corresponding files on the computer network.

The searchable database 824 has a search engine 836 that presents a web based interface enabling users to present key word searches or searches automated by detecting a watermark from a particular content item of interest. In the former case, the user supplies a key word search query, much like the user interfaces of Google or AltaVista, and the searchable database uses the key word query as input to a search of its index for related content. In the latter case, a watermark detector, such as reader application 808, extracts a watermark from a content file, and uses the watermark to derive content type tags for that file. The detector obtains these content type flags either directly from content type tags in the watermark message payload, or indirectly from a database look up of a content identifier from the watermark message to content type tags in the metadata database 816. The watermark detector 808 provides the search engine 836 with one or more content type tags for the content file of interest. The searchable database 824 uses the content type tags and/or the key word search terms to search the index of content 830, and returns pointers to the content items that match the search request. Since the search engine 836 has a web interface, it is accessible from remote computers (e.g., user's computer 806) via a conventional Internet browser application, or other applications with browser capability, such as watermark reader application 808.

The search agents 820 run on computers and computer networks that are difficult to access through conventional web crawler searching. The search agents have a number of parameters that control their operation. In particular, the agents have input parameters that enable a web master to specify the directories, times, and CPU usage for searching (e.g., search designated directories 838 between 1 A.M. and 5 A.M. using no more than x % of CPU time per machine in each thread of execution). In web servers, the search agent can be programmed to minimize interference with request for files to be searched, and can be programmed to search redundant copies of content on a web site so as to not interfere with web site content that is accessible for downloading by others.

By running locally on the web server 822 or user's machine 806, the search agent can also search non-HTML files, such as Word documents, PowerPoint presentations, spread sheets, databases and watermarked media for deep searching. By running in a distributed architecture, more content can be searched and categorized. The agent preferably runs as a distributed agent on the web server or local computer network 822, using idle computer processing cycles of computers in the evening or other off-peak hours. In addition, the searching agent is intelligent. The agent can use search agent technology such as RuleSpace for text and Virage for video categorization.

Images, audio and video in the file directory of the web server or local network 822 to be searched are watermarked and categorized based on content tags stored in the router system 814 or metadata database 816. In particular, the content identifier in the watermark embedded in the content is associated with usage rules stored in the router's registry 818 and/or metadata database 816. These usage rules can be used to specify the content type and control how the content is indexed and used by those that access the content via the searchable database 824. Using this approach, more web content can be better categorized, thus improving consumers' searches and properly indexing every company's web server.

The above system is intended for enabling wider access to content on web servers to others on the Internet via the searchable database that indexes the content. However, a similar structure may be used for internal digital asset management (DAM) within a company's local or wide area computer network. In particular, in this configuration, the digital asset management system runs within the company's Intranet, and the search agent 820 runs on every employee's computer. More specifically, each employee marks directories on his computer or network directory that are to be continually searched (e.g., the designated directories 838), categorized and reported to the central Intranet search site (the searchable database having a repeatedly updated index of accessible content on the Intranet). Each employee moves important documents and watermarked content files to that directory when finished, or allows people to search on documents in process. For example, as the user creates content files like images, audio or video 840, she invokes a watermark embedder application 842 to embed a content identifier or content type tags into an imperceptible watermark embedded in the content. These watermarks enable the search agent 820 to find the content to be indexed in the designated directories, and further, enable the system to index the watermarked files in the searchable database 824, which is then searchable by others. The searchable database 824 returns pointers to where content files satisfying a search can be found in the Intranet, and fetched automatically. In summary, the system helps employees of large companies to access and share company information.

As an alternative to a watermark embedder, a file header inserter may be used to write content type tags into the header or footer of the file. In this case, the search agent is programmed to read the file header/footer for content type tags. Otherwise, operation of the system is similar.

While the above structure helps locate digital assets and associate usage rules, the system also shows the relationship between content items, like documents, images, audio, etc. For example, when a user finds a document satisfying a search request, the user interface of the search engine 836 returns an interface displaying all of the linked files, such as for HTML, word processor documents, etc., and inserted objects, such as images, audio, video, etc.

This system advantageously employs digital watermarks and key word text to index content within company networks. The watermarks carry identifiers that link the content to metadata through the router and metadata database. This metadata, in turn, enables the content to be indexed for searching.

The systems described above overcome key obstacles to effectively associating content with its metadata. One of the key obstacles with any digital asset management system is the cost of inputting the metadata associated with each digital asset file. By using watermarks to identify and link through the router system, the system overcomes this obstacle.

To illustrate, consider the following example. I take a picture with my digital camera and store the image in my digital asset management (DAM) system (e.g., content database 802 and metadata database system 816). I enter in associated metadata (maybe the name of the beach it was taken on), which is stored in the metadata database 816. The image is watermarked with an Image ID, establishing a link between the Image ID and the metadata database entry storing the name of the beach. I now distribute the image to my business partners. One partner takes the image and stores it in his DAM system. This system recognizes the watermark, links through the router to the metadata database in my DAM system —which responds by supplying all the metadata. This data is then automatically entered into my partner's system —improving productivity and accuracy, and gaining metadata that could not be determined from the image itself (the name of the beach). In this manner, the imperceptibly embedded digital watermark in content items enables disparate DAM systems to interoperate and share content items.

Moreover, the metadata for a content item stores usage rules that govern where the metadata and content file is allowed to be shared (e.g., to a particular authenticated user, to a particular authenticated machine, etc.). This authentication scheme is implemented by requiring the user who wants access to the content or its metadata to supply authentication data, such as a particular computer address, password, etc.

The system combines two powerful functions: automatically indexing content files through the search agent and searchable database, and automatically indexing the metadata associated with those content files.

The searchable database 824 may be centralized or distributed over a number of computers interconnected on a network. The content index 824 can be searched from a standard browser as noted above, or searched by agents, as in the Gnutella system. In file sharing networks, the search agent 820 can be programmed to scan files on a user's computer while the computer is connected to the file sharing network. Alternatively, the search agent can run on the user's computer in off-peak times and create a local index of content on the user's machine. Then, whenever the user connects, this index created locally by the search agent shares the user's local index with a central content index maintained by the searchable database 824 or a distributed content index database that is shared among users of the file sharing network.

Dynamic Identifier Extraction from Audio Content or Related Data

Another way to associate an identifier with a corresponding media signal is to derive the identifier from the signal itself without using embedded auxiliary data. This approach has the advantage that the auxiliary data embedding process is unnecessary. Instead, the decoding process can generate the identifier from the audio, video or image object. In the case of an audio signal for example, the decoder computes a fingerprint of the audio signal based on a specified fingerprinting algorithm. The fingerprint is a number derived from a digital audio signal that serves as a statistically unique identifier of that signal, meaning that there is a high probability that the fingerprint was derived from the audio signal in question. One component of fingerprint algorithm is a hash algorithm. The hash algorithm may be applied to a selected portion of a music file (e.g., the first 10 seconds) to create a fingerprint. It may be applied to discrete samples in this portion, or to perceptual attributes that are less sensitive to typical audio processing. Examples of less sensitive attributes include most significant bits of audio samples, a low pass filtered version of the portion, and certain robust frequency coefficients. Examples of hashing algorithms include MD5, MD2, SHA, and SHA1.

As an aside, fingerprinting may also be used to determine whether an audio signal has been watermarked. The fingerprinting application can evaluate a fingerprint for a received object and compare it with one for a watermarked object (or unmarked object) to determine whether the object is likely to be watermarked. Certain fingerprints can be associated with certain types of watermark methods. Using the fingerprint, a decoding device can select an appropriate watermark decoding system for the object.

While specifically discussed in the context of audio objects, the fingerprinting process applies to other types of multimedia content as well, including still images, video, graphics models, etc. For still images and video, the identifier can be derived dynamically from a compressed or uncompressed version of the image or video signal. The fingerprinting process may be tuned to generate a specific identifier based on the type of file format. For example, the process extracts the file format from the file (e.g., from a header or footer), and then uses a fingerprinting process tailored for that type of file (e.g., a hash of a compressed image or video frame). The dynamic identifier computed by this process may be associated with metadata and/or actions using the processes and systems described in this document.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles of the invention can be applied, it should be recognized that the detailed embodiments are illustrative only and should not be taken as limiting the scope of the invention. Rather, we claim as our invention all such embodiments as may come within the scope and spirit of the following claims, and equivalents thereto.

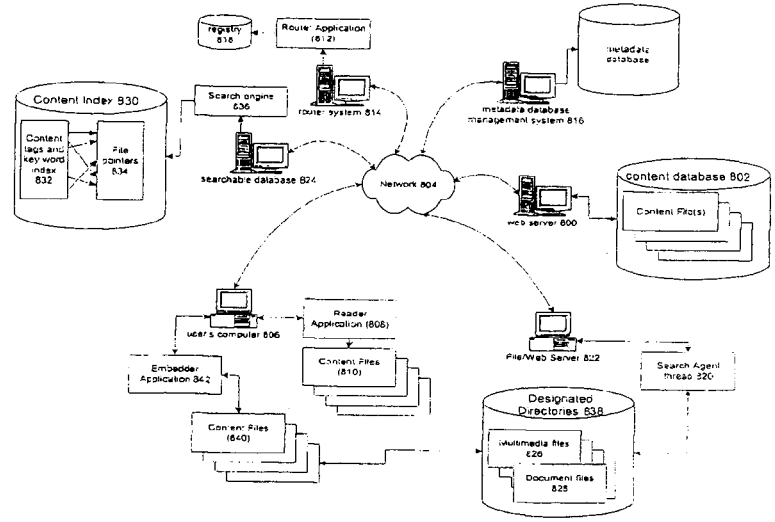

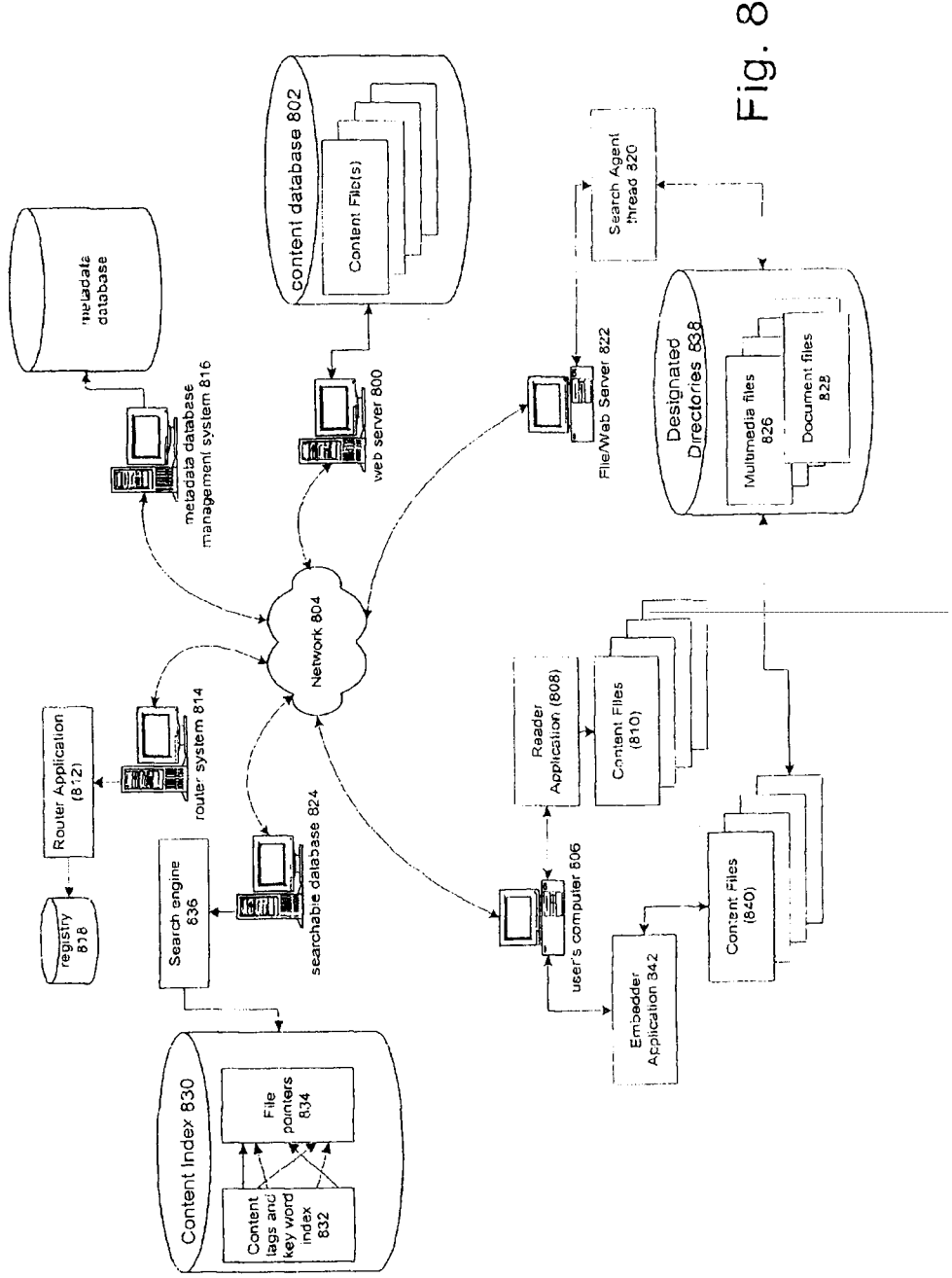

We claim:

1. A method of connecting multimedia content to a network resource comprising:
   in a network connected device, extracting an identifier from a media signal;
   sending the identifier to a network along with context information indicating device type information, where the identifier is used to look up related data for the media signal;
   from the network, receiving the related data associated with the media signal via the identifier, where a format of the related data is adapted to the network connected device based on the device type information.

2. The method of claim 1 wherein the device type information includes a display type of the network connected device, and the related data received from the network is formatted for the display type based on the device type information from the network connected device.

3. The method of claim 1 wherein the device type information includes a connection speed of the network connected device, and the related data received from the network is selected based on the connection speed.

4. A non-transitory computer readable medium on which is stored instructions for performing the method of claim 1.

5. The method of claim 1 wherein the identifier comprises a digital watermark embedded in the media signal.

6. The method of claim 1 wherein the identifier comprises a hash of attributes of the media signal.

7. The method of claim 6 wherein the attributes comprise frequency components of the media signal.

8. The method of claim 1 wherein the identifier is processed by a data formatting process on the network used to format Internet content for rendering on a hand held device.

9. A method comprising:
   in a network connected device, extracting an identifier from a media signal;
   sending the identifier to a network along with context information, where the identifier and context information is used to look up related data for the media signal;
   from the network, receiving the related data associated with the media signal via the identifier and context information, wherein the related data includes usage rights and the usage of the media signal in the network connected device is controlled via the usage rights.

10. The method of claim 9 wherein the context information comprises a device identifier.

11. The method of claim 9 wherein the context information comprises a user identifier.

12. The method of claim 9 wherein the context information comprises a device type.

13. The method of claim 9 wherein the identifier is carried in a digital watermark embedded in the media signal.

14. The method of claim 9 wherein the identifier comprises a hash of attributes of the media signal.

15. A method comprising:
   in a network connected device, extracting an identifier from a media signal;
   using the identifier and context information to identify usage rights for the media signal; and
   controlling rendering, playback or transfer of the media signal in accordance with the usage rights.

16. The method of claim 15 wherein the context information comprises a device identifier.

17. The method of claim 15 wherein the context information comprises a user identifier.

18. The method of claim 15 wherein the context information comprises a device type.

19. The method of claim 15 wherein the identifier is carried in a digital watermark embedded in the media signal.

20. The method of claim 15 wherein the identifier comprises a hash of attributes of the media signal.

* * * * *

UNITED STATES PATENT AND TRADEMARK OFFICE
CERTIFICATE OF CORRECTION

PATENT NO. : 8,332,478 B2
APPLICATION NO. : 09/952475
DATED : December 11, 2012
INVENTOR(S) : Levy et al.

It is certified that error appears in the above-identified patent and that said Letters Patent is hereby corrected as shown below:

The title page showing the illustrative figure should be deleted to be replaced with the attached title page.

On the Title Page, Item (54) and in the Specification, Column 1, Line 1, delete "CONTEXT" and insert -- CONTENT --, therefor.

On Title Page 3, Item (56), under "FOREIGN PATENT DOCUMENTS", in Column 1, Line 10, delete "WO WO97/43736 11/1997".

On Title Page 3, Item (56), under "OTHER PUBLICATIONS", in Column 1, Line 4, delete "al," and insert -- al., --, therefor at each occurrence throughout the Other Publications.

On Title Page 3, Item (56), under "OTHER PUBLICATIONS", in Column 2, Line 13, delete "pp. 59-68" on p. 3 of the below cited Mar. 24, 2006" and insert -- pp. 59-68," on p. 3 of the below cited Mar. 24, 2006, --, therefor.

On Title Page 3, Item (56), under "OTHER PUBLICATIONS", in Column 2, Line 18, delete "Paten" and insert -- Patent --, therefor.

On Title Page 3, Item (56), under "OTHER PUBLICATIONS", in Column 2, Line 33, delete "Interface"," and insert -- Interface," --, therefor.

On Title Page 3, Item (56), under "OTHER PUBLICATIONS", in Column 2, Line 37, delete "1995)" and insert -- 1995), --, therefor.

On Title Page 3, Item (56), under "OTHER PUBLICATIONS", in Column 2, Line 41, delete "al." and insert -- al., --, therefor.

Signed and Sealed this
Eighth Day of October, 2013

Teresa Stanek Rea
*Deputy Director of the United States Patent and Trademark Office*

On Title Page 3, Item (56), under "OTHER PUBLICATIONS", in Column 2, Line 43, delete "(CHI '92)" and insert -- (CHI '92), --, therefor.

On Title Page 3, Item (56), under "OTHER PUBLICATIONS", in Column 2, Line 58, delete "97924752.5." and insert -- 97924752.5, --, therefor.

On Title Page 3, Item (56), under "OTHER PUBLICATIONS", in Column 2, Line 62, delete "(allowed)." and insert -- (allowed), --, therefor.

On Title Page 3, Item (56), under "OTHER PUBLICATIONS", in Column 2, Line 65, delete "97924 752.5 (allowed)." and insert -- 97924752.5 (allowed), --, therefor.

In the Drawings:

In the drawing sheets, consisting of Figs. 7 and 8, should be deleted to be replaced with the drawing sheets, consisting of Figs. 7 and 8, as shown on the attached pages.

In the Specifications:

In Column 1, Line 28, delete "into." and insert -- into --, therefor.

In Column 2, Line 8, delete "al)," and insert -- al.), --, therefor.

In Column 2, Line 9, delete "al)," and insert -- al.), --, therefor.

In Column 2, Line 10, delete "etc." and insert -- etc.). --, therefor.

In Column 3, Line 14, delete "a object" and insert -- an object --, therefor.

In Column 4, Line 53, delete "a extract" and insert -- an extract --, therefor.

In Column 7, Line 47, delete "image." and insert -- image --, therefor.

In Column 10, Line 32, delete "users" and insert -- user's --, therefor.

In Column 13, Line 3, delete "The may" and insert -- They may --, therefor.

In Column 20, Line 59, delete "43" and insert -- 1243 --, therefor.

In Column 20, Line 62, delete "44." and insert -- 1244. --, therefor.

CERTIFICATE OF CORRECTION (continued)
U.S. Pat. No. 8,332,478 B2

In Column 20, Line 63, delete "Ser." and insert -- Serial --, therefor.

In Column 23, Line 50, delete "09/571.422 filed May 15. 2000 (Now Pat. No. 6.947.5711)." and insert -- 09/571,422 filed May 15, 2000 (Now Pat. No. 6,947,571). --, therefor.

(12) United States Patent
Levy et al.

(10) Patent No.: US 8,332,478 B2
(45) Date of Patent: Dec. 11, 2012

(54) CONTEXT SENSITIVE CONNECTED CONTENT

(75) Inventors: Kenneth L. Levy, Stevenson, WA (US); Geoffrey B. Rhoads, West Linn, OR (US); Reed R. Stager, Portland, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 3178 days.

(21) Appl. No.: 09/952,475

(22) Filed: Sep. 11, 2001

(65) Prior Publication Data
US 2002/0033844 A1    Mar. 21, 2002

Related U.S. Application Data

(63) Continuation-in-part of application No. 09/636,102, filed on Aug. 10, 2000, now abandoned, and a continuation-in-part of application No. 09/620,019, filed on Jul. 20, 2000, now Pat. No. 7,689,532, and a continuation-in-part of application No. 09/531,076, filed on Mar. 18, 2000, now Pat. No. 8,180,844, and a continuation-in-part of application No. 09/526,982, filed on Mar. 15, 2000, now Pat. No. 6,516,079, and a continuation-in-part of application No. 09/507,096, filed on Feb. 17, 2000, now abandoned, and a continuation-in-part of application No. 09/503,881, filed on Feb. 14, 2000, now Pat. No. 6,614,914, and a continuation-in-part of application No. 09/165,142, filed on Oct. 1, 1998, now Pat. No. 6,421,070.

(60) Provisional application No. 60/191,778, filed on Mar. 24, 2000, provisional application No. 60/232,163, filed on Sep. 11, 2000, provisional application No. 60/282,205, filed on Apr. 6, 2001.

(51) Int. Cl.
*G06F 15/16* (2006.01)

(52) U.S. Cl. ........ 709/217; 709/218; 709/219; 370/464; 370/474; 382/232; 713/176

(58) Field of Classification Search .............. 705/51; 713/173; 345/744; 709/217, 231, 247, 220, 709/223, 249
See application file for complete search history.

(56) References Cited

U.S. PATENT DOCUMENTS
4,230,990 A   10/1980   Lert et al.
(Continued)

FOREIGN PATENT DOCUMENTS
EP    0493091    7/1992
(Continued)

OTHER PUBLICATIONS
Rhoads, U.S. Appl. No. 60/134,782, filed May 19, 1999
(Continued)

*Primary Examiner* — Backhean Tiv

(57) ABSTRACT

The disclosure describes a method of connecting multimedia content to a network resource. This method operates in a computer network environment. Operating in a network connected device, the method extracts an identifier from a media signal, such as from a digital watermark, perceptual hash, or other machine extracted signal identifier. It then sends the identifier to a network along with context information indicating device type information. From the network, the method receives related data associated with the media signal via the identifier. The related data is adapted to the network connected device based on the device type information. This device type information may include a display type, so that the related data may be formatted for rendering on the display type of the device. This device type information may also include a connection speed so that the related data may be optimized for the connection speed of the device.

20 Claims, 8 Drawing Sheets